United States Patent
Cho et al.

(10) Patent No.: US 11,514,150 B2
(45) Date of Patent: Nov. 29, 2022

(54) VIDEO DISPLAY DEVICE AND OPERATING METHOD THEREFOR

(71) Applicant: Samsung Electronics Co., Ltd., Suwon-si (KR)

(72) Inventors: Eun-Ae Cho, Seoul (KR); Jinhyun Kim, Seoul (KR); Gihoon Park, Seoul (KR); Jae-Ook Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 451 days.

(21) Appl. No.: 16/642,154

(22) PCT Filed: Sep. 5, 2018

(86) PCT No.: PCT/KR2018/010350
§ 371 (c)(1),
(2) Date: Feb. 26, 2020

(87) PCT Pub. No.: WO2019/050265
PCT Pub. Date: Mar. 14, 2019

(65) Prior Publication Data
US 2020/0356653 A1 Nov. 12, 2020

(30) Foreign Application Priority Data

Sep. 5, 2017 (KR) .................. 10-2017-0113352
Jul. 18, 2018 (KR) .................. 10-2018-0083651

(51) Int. Cl.
*G06F 21/36* (2013.01)
*G06F 16/583* (2019.01)
(Continued)

(52) U.S. Cl.
CPC ............ *G06F 21/36* (2013.01); *G06F 16/583* (2019.01); *G06N 3/084* (2013.01); *G06N 3/088* (2013.01); *G06V 40/172* (2022.01)

(58) Field of Classification Search
CPC .................. G06F 16/583; G06F 21/36; G06F 2221/2149; G06N 3/08; G06N 3/084;
(Continued)

(56) References Cited

U.S. PATENT DOCUMENTS 9,008,423 B2 4/2015 Cho et al.
2005/0060554 A1 3/2005 O'Donoghue
(Continued)

FOREIGN PATENT DOCUMENTS

KR 10-2006-0052975 5/2006
KR 10-0794509 1/2008
(Continued)

OTHER PUBLICATIONS

Alsaiari et al. "Graphical one-time password (GOTPass): a usability evaluation." Information Security Journal: A Global Perspective 25.1-3 (2016): 94-108. (Year: 2016).*
(Continued)

*Primary Examiner* — Katrina R Fujita
(74) *Attorney, Agent, or Firm* — Nixon & Vanderhye, P.C.

(57) ABSTRACT

Provided is an artificial intelligence (AI) system simulating functions of a human brain, such as recognition and decision, by using a machine learning algorithm, such as deep-learning.

(Continued)

Image display apparatuses are more convenient for a user, by performing user authentication by using an authentication image set generated based on an object recognized from content viewed by the user.

15 Claims, 19 Drawing Sheets

(51) Int. Cl.
  *G06N 3/08* (2006.01)
  *G06V 40/16* (2022.01)
(58) Field of Classification Search
  CPC ......... G06N 3/088; G06T 7/0014; G06T 7/11; G06T 2207/20081; G06V 40/172
  See application file for complete search history.

(56) References Cited

U.S. PATENT DOCUMENTS

| | | | |
|---|---|---|---|
| 2010/0058437 | A1 | 3/2010 | Liew et al. |
| 2011/0154482 | A1 | 6/2011 | Heiner et al. |
| 2013/0251212 | A1 | 9/2013 | Leddy |
| 2014/0130148 | A1 | 5/2014 | Sako et al. |
| 2016/0306994 | A1 | 10/2016 | Olsen-Kreusch |
| 2017/0161477 | A1* | 6/2017 | Liu .................. H04L 63/12 |
| 2018/0048634 | A1* | 2/2018 | Fang .................. G06Q 20/389 |
| 2019/0236258 | A1* | 8/2019 | Mooney ............... G06F 3/0482 |

FOREIGN PATENT DOCUMENTS

| | | |
|---|---|---|
| KR | 10-2014-0090777 | 7/2014 |
| KR | 10-2016-0025896 | 3/2016 |
| KR | 10-1620953 | 5/2016 |

OTHER PUBLICATIONS

Belk et al. "A personalized user authentication approach based on individual differences in information processing." Interacting with Computers 27.6 (2015): 706-723. (Year: 2015).*
Catuogno, et al. "Towards the design of a film-based graphical password scheme." 8th International Conference for Internet Technology and Secured Transactions (ICITST-2013). IEEE, 2013. (Year: 2013).*
Jakobsson et al. "Implicit authentication for mobile devices." Proceedings of the 4th USENIX conference on Hot topics in security. vol. 1. USENIX Association, 2009. (Year: 2009).*
Nguyen et al. "Personalized Image-based User Authentication using Wearable Cameras." arXiv preprint arXiv:1612.06209 (2017). (Year: 2017).*
International Search Report dated Dec. 10, 2018 for PCT/KR2018/010350 and English-language translation.
Written Opinion dated Dec. 10, 2018 for PCT/KR2018/010350 and English-language translation.
Notice of Allowance dated Aug. 23, 2019 for Korean Patent Application No. 10-2018-0083651.
Extended Search Report dated Mar. 30, 2020 in counterpart European Patent Application No. 18853051.3.
Goodfellow, Ian J. et al, "Explaining and Harnessing Adversarial Examples," ICLR 2015, Mar. 20, 2015, XP055535149, retrieved from the Internet Dec. 17, 2018.
Xue, Zhiyun et al., "Improving Face Image Extraction by Using Deep Learning Technique," Progress in Biomedical Optics and Imaging, SPIE, International Society for Optical Engineering, Bellingham, WA, US., vol. 9789, Mar. 25, 2016, pp. 97890J-97890J.

* cited by examiner

FIG. 1
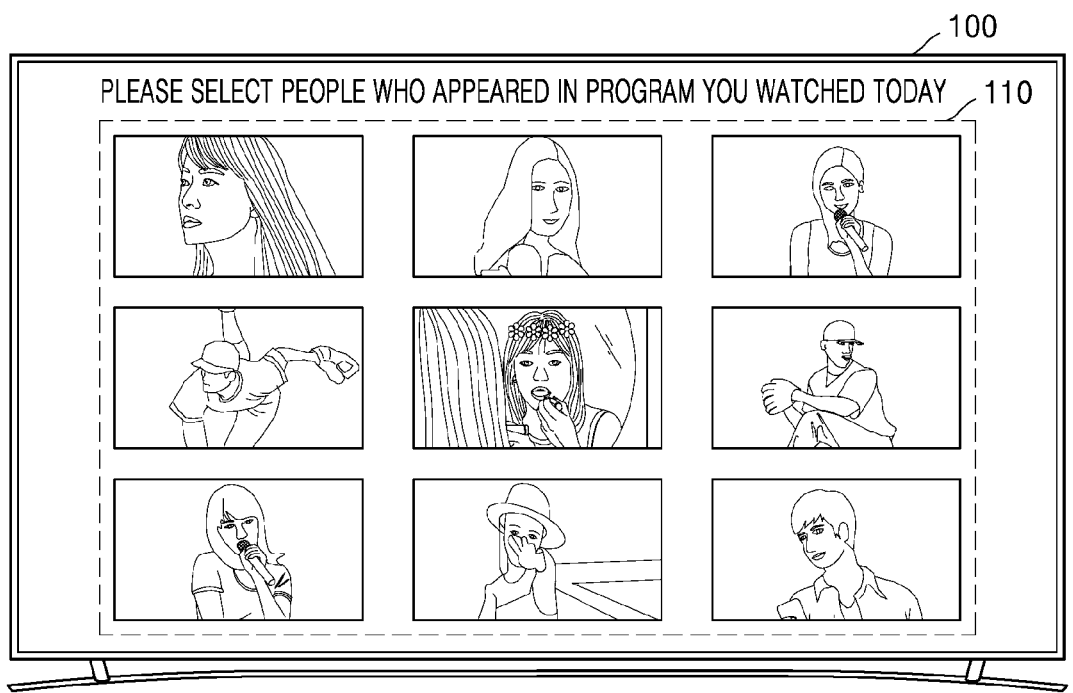
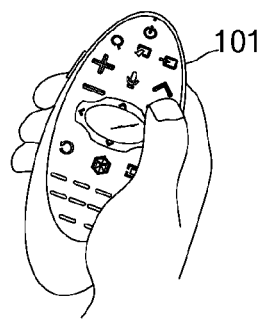

VIDEO DISPLAY DEVICE AND OPERATING METHOD THEREFOR

This application is the U.S. national phase of International Application No. PCT/KR2018/010350 filed Sep. 5, 2018 which designated the U.S. and claims priority to Korean Patent Application No. 10-2017-0113352 filed on Sep. 5, 2017, and Korean Patent Application No. 10-2018-0083651 filed on Jul. 18, 2018, the entire contents of each of which are hereby incorporated by reference.

TECHNICAL FIELD

The disclosure relates to image display apparatuses and operating methods of the same, and more particularly, to a method, performed by an image display apparatus, of authenticating a user.

BACKGROUND ART

With the development of communication technology, various security systems are required. In order to safely access an electronic apparatus or a network, a method of authenticating a user by using a personal identification number (PIN) has been widely used. However, since the user may forget the PIN, the method of authenticating the user by using the PIN may cause inconvenience to the user. Accordingly, recently, various methods of authenticating a user without the user having to memorize separate information have been studied.

In particular, with the development of artificial intelligence (AI) technology, a method of conveniently and safely performing user authentication by collecting and analyzing various contexts capable of indicating an authorized user have been studied.

An AI system is a computer system capable of realizing human level intelligence. The AI system is a system in which a machine trains itself, makes decisions, and becomes smarter, unlike an existing rule-based smart system. The more the AI system is used, a recognition rate is increased and a user's taste is more accurately understood, and thus, the existing rule-based smart system is gradually being replaced by a deep-learning-based AI system.

AI technology includes machine learning (deep learning) and element technologies using the machine learning.

The machine learning is an algorithm technology that self-classifies and learns features of input data. An element technology is a technology for simulating functions of a human brain, such as recognition and decision, by using a machine learning algorithm, such as deep-learning, and includes technical fields of linguistic understanding, visual understanding, inference/prediction, knowledge representation, or operation control.

Various fields to which the AI technology is applied are as follows. Verbal understanding is technology to recognize languages/characters of people and apply/process the languages/characters, and includes natural language processing, machine translation, a dialog system, questions and answers, or voice recognition/synthesis. Visual understanding is technology to recognize an object like in human vision, and includes object recognition, object tracing, image search, person recognition, scene understanding, space understanding, or image improvement. Inference/prediction is technology to logically infer and predict information by determining the information, and includes knowledge/probability-based inference, optimization prediction, preference-based plans, or recommendation. Knowledge representation is technology to automate experience information to knowledge data, and includes knowledge building (data generation/classification) or knowledge management (data application). Operation control is technology to control automatic driving of a vehicle or movement of a robot, and includes movement control (navigation, collision avoidance, driving) or manipulation control (behavior control).

DESCRIPTION OF EMBODIMENTS

Technical Problem

Provided are image display apparatuses that perform user authentication based on content viewed by a user, and operating methods of the image display apparatuses.

Provided are user authentication methods more convenient to a user, by performing user authentication using an authentication image set generated based on an object recognized from content viewed by the user.

Solution to Problem

In accordance with an aspect of the disclosure, an image display apparatus includes a display; a memory storing at least one instruction; a processor configured to execute the at least one instruction stored in the memory to: recognize at least one object from first content output on the display and viewed by a user, by using a learning model using at least one neural network; store an image indicating the at least one object recognized from the first content in a database as a true image; in response to a user authentication request, select at least one first true image and at least one first false image respectively from a plurality of true images and a plurality of false images stored in the database, and control the display to output an authentication image set including the selected at least one first true image and at least one first false image; and perform user authentication in response to a user input of selecting at least one image from the authentication image set.

The first content may be content viewed within a pre-set time from a point of time when the user authentication request is received, and the image indicating the at least one object recognized from the first content may include at least one object extracted from the first content.

The processor may be further configured to execute the at least one instruction to: recognize at least one object from second content viewed a pre-set time before a point of time when the user authentication request is received, by using the learning model using the at least one neural network; and obtain an image indicating at least one object recognized from the second content as one of the plurality of false image.

The processor may be further configured to execute the at least one instruction to: recognize at least one face from the first content by using the learning model using the at least one neural network; and store, as the true image, an image indicating a person corresponding to each of the at least one face recognized from the first content in the database.

The processor may be further configured to execute the at least one instruction to update the plurality of false images stored in the database every pre-set period.

The at least one object may include at least one of a person, a background, and a thing appearing in at least one frame among a plurality of frames forming the first content.

The processor may be further configured to execute the at least one instruction to: recognize the at least one object from a plurality of frames forming the first content by using the learning model using the at least one neural network; and store, as the true image, an image indicating an object included in the plurality of frames at least a pre-set number of times among the recognized at least one object in the database.

The processor may be further configured to execute the at least one instruction to receive, from an external server, at least one of the plurality of false images stored in the database and the learning model.

The processor may be further configured to execute the at least one instruction to determine a user who requested the user authentication as an authorized user in response to a user input of selecting all of the at least one first true image from the authentication image set.

The processor may be further configured to execute the at least one instruction to control the display to output a new authentication image set in response to a user input that failed to select all of the at least one first true image from the authentication image set.

In accordance with another aspect of the disclosure, an operating method of an image display apparatus includes recognizing at least one object from first content output on a display of the image display apparatus and viewed by a user, by using a learning model using at least one neural network; storing an image indicating the at least one object recognized from the first content in a database as a true image; in response to a user authentication request, selecting at least one first true image and at least one first false image respectively from a plurality of true images and a plurality of false images stored in the database, and outputting an authentication image set including the selected at least one first true image and at least one first false image; and performing user authentication in response to a user input of selecting at least one image from the authentication image set.

Advantageous Effects of Disclosure

As described above, according to one or more embodiments, an object included in content viewed by a user is recognized and user authentication is performed by using an authentication image set including at least one image including the recognized object, and thus it may be determined whether a user of an image display apparatus, for example, the image display apparatus 201, has proper authority while maintaining high security.

Also, according to one or more embodiments, at least one image to be included in an authentication image set is modified by using AE technique so as to prevent an AI-based hacking attack, thereby increasing security.

BRIEF DESCRIPTION OF DRAWINGS

FIG. 1 is a diagram for describing an example of an image display apparatus 100 performing user authentication, according to an embodiment;

BEST MODE

Figure 2:
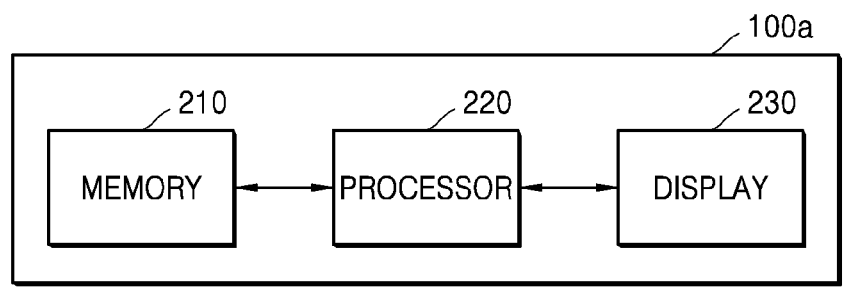
FIG. 2 is a block diagram of a configuration of an image display apparatus, according to an embodiment.

In accordance with an aspect of the disclosure, an image display apparatus includes a display; a memory storing at least one instruction; a processor configured to execute the at least one instruction stored in the memory to: recognize at least one object from first content output on the display and viewed by a user, by using a learning model using at least one neural network; store an image indicating the at least one object recognized from the first content in a database as a true image; in response to a user authentication request, select at least one first true image and at least one first false image respectively from a plurality of true images and a plurality of false images stored in the database, and control the display to output an authentication image set including the selected at least one first true image and at least one first false image; and perform user authentication in response to a user input of selecting at least one image from the authentication image set.

The first content may be content viewed within a pre-set time from a point of time when the user authentication request is received, and the image indicating the at least one object recognized from the first content may include at least one object extracted from the first content.

The processor may be further configured to execute the at least one instruction to: recognize at least one object from second content viewed a pre-set time before a point of time when the user authentication request is received, by using the learning model using the at least one neural network; and obtain an image indicating at least one object recognized from the second content as one of the plurality of false image.

The processor may be further configured to execute the at least one instruction to: recognize at least one face from the first content by using the learning model using the at least one neural network; and store, as the true image, an image indicating a person corresponding to each of the at least one face recognized from the first content in the database.

The processor may be further configured to execute the at least one instruction to update the plurality of false images stored in the database every pre-set period.

The at least one object may include at least one of a person, a background, and a thing appearing in at least one frame among a plurality of frames forming the first content.

The processor may be further configured to execute the at least one instruction to: recognize the at least one object from a plurality of frames forming the first content by using the learning model using the at least one neural network; and store, as the true image, an image indicating an object included in the plurality of frames at least a pre-set number of times among the recognized at least one object in the database.

The processor may be further configured to execute the at least one instruction to receive, from an external server, at least one of the plurality of false images stored in the database and the learning model.

The processor may be further configured to execute the at least one instruction to determine a user who requested the user authentication as an authorized user in response to a user input of selecting all of the at least one first true image from the authentication image set.

The processor may be further configured to execute the at least one instruction to control the display to output a new authentication image set in response to a user input that failed to select all of the at least one first true image from the authentication image set.

In accordance with another aspect of the disclosure, an operating method of an image display apparatus includes recognizing at least one object from first content output on a display of the image display apparatus and viewed by a user, by using a learning model using at least one neural network; storing an image indicating the at least one object recognized from the first content in a database as a true image; in response to a user authentication request, selecting at least one first true image and at least one first false image respectively from a plurality of true images and a plurality of false images stored in the database, and outputting an authentication image set including the selected at least one first true image and at least one first false image; and performing user authentication in response to a user input of selecting at least one image from the authentication image set.

Mode of Disclosure

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects. In the drawings, elements irrelevant to the description are not shown for clearer description, and like elements denote like reference numerals throughout the specification.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure.

Thus, the terms used herein have to be defined based on the meaning of the terms together with the description throughout the specification. As used herein, the term "and/or" includes any and all combinations of one or more of the associated listed items. Expressions such as "at least one of," when preceding a list of elements, modify the entire list of elements and do not modify the individual elements of the list. The terms used in the present specification are merely used to describe particular embodiments, and are not intended to limit the present disclosure. An expression used in the singular encompasses the expression in the plural, unless it has a clearly different meaning in the context. In the specification, when a region is "connected" to another region, the regions may not only be "directly connected", but may also be "electrically connected" via another device therebetween. Also, when a part "includes" or "comprises" an element, unless there is a particular description contrary thereto, the part can further include other elements, not excluding the other elements.

As used herein, the singular forms "a," "an" and "the" are intended to include the plural forms as well, unless the context clearly indicates otherwise. When a certain embodiment may be implemented differently, a specific process order may be performed differently from the described order. For example, two consecutively described processes may be performed substantially at the same time or performed in an order opposite to the described order.

The phrases "some embodiments", "an embodiment", etc. throughout the specification do not necessarily denote the same embodiment.

Some embodiments of the present disclosure may be described in terms of functional block components and various processing steps. Such functional blocks may be realized by any number of hardware and/or software components configured to perform the specified functions. For example the, functional blocks of the present disclosure may be implemented by one or more microprocessors or by circuit configurations for a certain function. Also, for example, the functional blocks of the present disclosure may be implemented using various programming or scripting languages. The functional blocks may be implemented in an algorithm executed by at least one processor. Also, the present disclosure may employ a related art for electronics configuration, signal processing and/or control, data processing and the like. The words "mechanism" and "element" are used broadly and are not limited to mechanical or physical embodiments.

Furthermore, connecting lines or connectors shown in the various figures presented are intended to represent exemplary functional relationships and/or physical or logical couplings between the various elements. It should be noted that many alternative or additional functional relationships, physical connections or logical connections may be present in a practical device.

Hereinafter, one or more embodiments will be described in detail with reference to the accompanying drawings.

FIG. 1 is a diagram for describing an example of an image display apparatus 100 performing user authentication, according to an embodiment.

Referring to FIG. 1, the image display apparatus 100 may be a television (TV), but is not limited thereto, and may be an electronic apparatus including a display. For example, the image display apparatus 100 may be embodied as any one of various electronic apparatuses, such as a mobile phone, a tablet personal computer (PC), a digital camera, a camcorder, a laptop computer, a desktop computer, an electronic book terminal, a digital broadcast terminal, a personal digital assistant (PDA), a portable multimedia player (PMP), a navigation device, an MP3 player, and a wearable device. Also, the image display apparatus 100 may be a fixed type or a movable type, and may be a digital broadcast receiver capable of receiving a digital broadcast.

The image display apparatus 100 may be embodied as not only a flat display apparatus, but also a curved display apparatus having a curvature or a flexible display apparatus having an adjustable curvature. An output resolution of the image display apparatus 100 may include, for example, high-definition (HD), full HD, ultra HD, or resolution clearer than ultra HD.

The image display apparatus 100 may be controlled by a control device 101, wherein the control device 101 may be embodied as any one of various types of devices for controlling the image display apparatus 100, such as a remote controller or a mobile phone. Alternatively, when a display of the image display apparatus 100 is embodied as a touch screen, the control device 101 may be replaced by a user's finger or an input pen.

Also, the control device 101 may control the image display apparatus 100 via an short-distance communication, such as infrared communication or Bluetooth communication. The control device 101 may control functions of the image display apparatus 100 by using at least one of a provided key (including a button), a touchpad, a microphone (not shown) for receiving user's voice, and a sensor (not shown) for recognizing motion of the control device 101.

The control device 101 may include a power on/off button for turning the image display apparatus 100 on or off. Also, the control device 101 may change a channel, adjust the volume, select terrestrial broadcasting, cable broadcasting, or satellite broadcasting, or set a configuration of the image display apparatus 100 according to a user input.

also, the control device 101 may be a pointing device. For example, the control device 101 may operate as a pointing device upon receiving a certain key input.

In one or more embodiments of the present specification, the term "user" denotes a person who controls a function or operation of the image display apparatus 100 by using the control device 101, and may include a viewer, a manager, or an installation engineer.

According to an embodiment, the image display apparatus 100 may perform user authentication by using an image indicating at least one object recognized from content viewed by a user. For example, when the image display apparatus 100 is a smart TV providing not only a broadcasting function, but also a function of providing content through the Internet, upon receiving an external input of accessing the Internet through the image display apparatus 100, it needs to be determined whether the external input is an input received from a user who has proper authority to use the image display apparatus 100. For example, when a user who does not have proper authority, such as a hacker, uses the image display apparatus 100, the user who does not have proper authority may access personal information stored in the image display apparatus 100, thereby leaking the personal information. Also, the user who does not have proper authority may maliciously behave by using the image display apparatus 100.

As another example, when content displayed through the image display apparatus 100 is content with an age limit (for example, a 15 rating), a user below an authorized age (for example, 12-year-old user) needs to be blocked from viewing the content. Accordingly, a method by which the image display apparatus 100 efficiently authenticates the user is required.

The image display apparatus 100 according to an embodiment may recognize at least one object from first content viewed by a user today, and perform user authentication by using an authentication image set including an image indicating the recognized at least one object. The authentication image set may include at least one true image and at least one false image.

The true image is an image used to determine whether the user is an authorized user, a user having proper authority to use the image display apparatus 100, or a user having authority to use certain content displayed on the image display apparatus 100, and for example, may include an image indicating the at least one object recognized from the first content viewed by the user today. Also, the false image is an image used to filter an unauthorized user, a user who does not have proper authority to use the image display apparatus 100, a user (for example, a hacker) who does not have authority to use certain content through the image display apparatus 100, or a computer controlled by an unauthorized user, and for example, may include an image indicating at least one content recognized from second content viewed by the user yesterday.

Referring to FIG. 1, the image display apparatus 100 may display an authentication image set including nine images of a plurality of true images and a plurality of false images, and enable a user to select all of the true images from the displayed authentication image set. Since an unauthorized user (for example, a hacker) is unable to distinguish first content viewed by the user today and second content viewed by the user yesterday, it is difficult for the unauthorized user to distinguish a true image and a false image included in the authentication image set. However, the user who viewed the first content today through the image display apparatus 100 is able to easily identify an image including at least one object recognized from the first content. Upon receiving a user input of selecting all of true images from the authentication image set, the image display apparatus 100 may determine that the user is an authorized user. Accordingly, the image display apparatus 100 may conveniently and easily distinguish an authorized user.

When user authentication is performed by using a personal identification number (PIN), the user may forget the PIN, and thus the user may be inconvenienced during the user authentication. However, when user authentication is performed by using the authentication image set generated based on an object recognized from content viewed by the user, the user does not need to separately remember a true image. Since the user who viewed the first content is able to easily identify an object appeared in the first content, the user may pass the user authentication by easily selecting a true image indicating an object recognized from the first content. Accordingly, the image display apparatus 100 may perform the user authentication more conveniently for the user.

FIG. 2 is a block diagram of a configuration of an image display apparatus 100a, according to an embodiment.

The image display apparatus 100a of FIG. 2 may be an example of the image display apparatus 100 of FIG. 1. Referring to FIG. 2, the image display apparatus 100a according to an embodiment may include a memory 210, a processor 220, and a display 230. However, the image display apparatus 100a may include more components than those shown in FIG. 2, and is not limited thereto.

Hereinafter, the above components are sequentially described.

The memory 210 according to an embodiment may store programs for processes and controls of the processor 220, and store data input to or output from the image display apparatus 100a.

The memory 210 may include at least one type of storage medium from among a flash memory, a hard disk, a multimedia card micro, a card type memory (for example, a security digital (SD) card or an extreme digital (XD) card), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The processor 220 according to an embodiment may recognize at least one object from first content output on the display 230 and viewed by a user, and store an image indicating the at least one object recognized from the first content in a database (not shown) as a true image, by using a learning model using at least one neural network. Here, the database may be provided in the processor 220 or a memory (for example, the memory 210) provided in the image display apparatus 100a. Alternatively, the database may be provided in an external apparatus (for example, a server 500 of FIG. 5 or a server 2000 of FIG. 13) connected to the image display apparatus 100a via a wireless or wired communication network. Also, the processor 220 may include a module including at least one instruction to output an authentication image set including at least one true image and at least one false image selected respectively from a plurality of true images and a plurality of false images stored in the database, in response to a user authentication request, and perform user authentication in response to a user input of selecting at least one image from the authentication image set.

Here, the user authentication request may be input by the user.

Also, the processor 220 may determine that the user authentication is requested when a certain event is issued in the image display apparatus 100a. For example, upon receiving an input of accessing the Internet, the image display apparatus 100a may recognize that the user authentication request is received and perform an operation corresponding to the user authentication request (for example, an operation for outputting the authentication image set). As another example, upon receiving an input of turning on the image display apparatus 100a, the image display apparatus 100a may determine that the user authentication request is received to determine whether a user who input the input is a user having proper authority to use the image display apparatus 100a, and perform the operation corresponding to the user authentication request. As another example, when content requested to be reproduced through the image display apparatus 100a is content with an age limit (for example, a 15 rating), a user below an authorized age needs to be blocked from viewing the content. In this case, when the content with the age limit is requested to be reproduced, the image display apparatus 100a may determine that the user authentication request is input and perform the operation corresponding to the user authentication request.

As another example, the user authentication request may be input through a remote control device (not shown) for remotely controlling the image display apparatus 100a.

According to an embodiment, the processor 220 may control the above operations to be performed by executing at least one instruction stored in the memory 210. In this case, the memory 210 may store at least one instruction executable by the processor 220.

Also, according to an embodiment, the processor 220 may store at least one instruction in an internal memory (not shown) provided therein, and control the above operations to be performed by executing the at least one instruction stored in the internal memory. In other words, the processor 220 may perform a certain operation by executing at least one instruction or program stored in the internal memory or the memory 210.

Also, according to an embodiment, the processor 220 may include a graphical processing unit (GPU) (not shown) for a graphical process corresponding to a video. The processor 220 may be embodied as a system-on-chip (SoC) in which a core (not shown) and a GPU (not shown) are integrated. The processor 220 may include a single core, a dual core, a triple core, a quad core, or multiple cores.

The memory 210 according to an embodiment may store an image indicating at least one object recognized from content viewed by the user. For example, the memory 210 may store, as a true image, an image indicating at least one object recognized from first content viewed within a pre-set time from a point of time when the user authentication request is received, in the database, according to control of the processor 220. Also, the memory 210 may store, as a false image, an image indicating at least one object recognized from second content viewed a pre-set time before the point of time when the user authentication request is received, in the database. The database may be included in the memory 210 or located in an external storage device.

The processor 220 controls overall operations of the image display apparatus 100a. For example, the processor 220 may execute the at least one instruction stored in the memory 210 to control the display 230, and perform functions of the image display apparatus 100a described with reference to FIGS. 1 through 18.

Also, in FIG. 2, one processor 220 is illustrated, but there may be a plurality of processors. In this case, each of operations performed by the image display apparatus 100a according to an embodiment may be performed through at least one of the plurality of processors.

The processor 220 according to an embodiment recognizes the at least one object from the first content output on the display 230 and viewed by the user, by using the learning model using the at least one neural network.

The neural network may be a group of algorithms learning a method of recognizing an object from a certain image input to the neural network based on artificial intelligence (AI). For example, the neural network may learn a method of recognizing an object from an image, based on unsupervised learning in which a pattern for recognizing an object from an image is discovered by self-training a type of data required to recognize an object from an image without separate supervision. Also, for example, the neural network may be learn a method of recognizing an object from an image by using reinforced learning that uses feedback about whether a result of recognizing an object according to learning is correct.

Also, the neural network performs operations for interference and prediction according to AI technology. In particular, the neural network may be a deep neural network (DNN) performing operations through a plurality of layers. The neural network is classified as DNN when the number of layers is plural according to the number of internal layers for performing operations, that is, when the depth of the neural network performing an operation increases. Also, a DNN operation may include a convolution neural network (CNN) operation. In other words, the processor 220 may implement a data determination model for recognizing an object through the neural network, and learn the implemented data determination model using training data. Then, by using the learned data determination model, it is possible to analyze or classify an image, which is input data, to analyze and classify an object included in the image.

Operations performed through the neural network according to an embodiment will be described in detail later with reference to FIG. 23.

For example, the processor 220 may recognize at least one face in the first content by using the learning model using the at least one neural network. For example, the processor 220 may recognize the at least one object in the first content, for example, a face of a person, by performing an operation through DNN.

Also, the processor 220 may recognize the face in the first content by using the learning model. Alternatively, according to an embodiment, the processor 220 may recognize at least one thing (for example, a vehicle, a bag, an electronic apparatus, or the like) in the first content. Also, the processor 220 may recognize a background or place in the first content. Also, what the processor 220 recognizes may include a anything that is in the first content and recognizable by the user as an independent object, and is not limited thereto. Here, the first content may denote content viewed by the user within the pre-set time from the point of time when the user authentication request is received, among a plurality of pieces of content. It may be difficult for the user to identify whether a certain object is an object in content that has been viewed, as time passes after viewing the content. Accordingly, the image display apparatus 100*a* may store, as a true image, an image indicating an object recognized from content viewed within a pre-set time (for example, 3 hours) from the point of time when the user authentication request is received.

Alternatively, the first content may be content viewed by the user most recently.

Alternatively, the first content may be the content viewed within the pre-set time from the point of time when the user authentication request is received when there is one, and may be the content viewed by the user most recently when there is no the content viewed within the pre-set time from the point of time when the user authentication request is received.

Also, the first content may be content viewed at least a certain period of time. When the user viewed the first content for a short period of time, for example, for 10 minutes or 30 minutes, the user may be unable to entirely recognize objects in the first content. Thus, the first content may be set to be content viewed at least a certain period of time.

Also, an object included in the true image among objects in the first content may be an object included in the first content reproduced during a time viewed by the user. For example, when a total reproduction time of the first content is two hours, the user may view the first content for one hour and thirty minutes from a reproduction start time of the first content and not view the last 30 minutes of the first content.

In this case, an object of the first content, which appears in images reproduced for 1 hour and 30 minutes from the reproduction start time, may be set as the object included in the true image.

Hereinafter, for convenience of description, it is described that the first content is content viewed within the pre-set time (for example, 3 hours, 6 hours, or the like) from the point of time when the user authentication request is received.

The image indicating the at least one object recognized from the first content may include an image extracted from the first content, and may include an image extracted from another piece of content where the object recognized from the first content appears. For example, the processor 220 may recognize at least one face from the first content, and store, as the true image, an image indicating a person corresponding to the face recognized from the first content in the database.

Also, according to an embodiment, object recognition may be performed in units of unit image included in the first content. Here, a unit image may be a frame, a scene, or a group of pictures (GOP). Hereinafter, for convenience of description, it is described that the unit image is a frame.

In particular, the processor 220 may perform object recognition in units of frame forming the first content. For example, the processor 220 may recognize at least one face imaged in a plurality of frames forming the first content, and store, as the true image, an image indicating a person corresponding to each face recognized from the first content in the database.

Also, the processor 220 according to an embodiment may control the display 230 to output the authentication image set including at least one true image and at least one false image selected respectively from the plurality of true images and the plurality of false images stored in the database, in response to the user authentication request.

The database may store the plurality of true images and the plurality of false images. The false image may include an image indicating an object recognized from the second content that has been viewed at least a pre-set time (for example, at least 24 hours) before.

Also, the second content may be content reproduced before a certain time, such as 24 hours or a week, based on a point of time when the first content starts to be reproduced. For example, when the user authentication request is input at 20:00 on Jul. 5, 2017 and the first content is content viewed from 17:00 to 18:00 on Jul. 5, 2017, the second content may be content reproduced 24 hours before 17:00 of Jul. 5, 2017 that is the reproduction start time of the first content. A specific value of the certain time, such as 24 hours or a week, may vary according to users or configurations of the image display apparatus 100*a*.

Also, the image display apparatus 100*a* may update the false image stored in the database every pre-set period (for example, once every day). When the false image stored in the database is fixed, an electronic apparatus controlled by an unauthorized external user may learn the false image stored in the database. Accordingly, the image display apparatus 100*a* may update the false image stored in the database every pre-set period so as to more efficiently identify an authorized user.

In response to a user input of a user selecting all of the true images from the displayed authentication image set, the processor 220 according to an embodiment may determine the user as an authorized user. As described above, the authorized user may include a user having proper authority to use the image display apparatus 100*a* or a user having authority to view content displayed through the image display apparatus 100*a*, but is not limited thereto. For example, when the authentication image set including three true images and six false images is displayed, the processor 220 may determine the user as an authorized user in response to the user input of selecting the three true images. Then, the processor 220 may control the display 230 to output a message indicating an authorized user, but is not limited thereto.

On the other hand, when the user input fails to select all of the true images from the authentication image set, the processor 220 may control the display 230 to output a new authentication image set. Also, according to an embodiment, when the user input fails to select all of the true images from the authentication image set at least a pre-set number of times, the processor 220 may control the display 230 to output a message indicating failure of the user authentication.

The display 230 according to an embodiment may display the authentication image set used for the user authentication. The number of images included in the authentication image set may vary according to embodiments. For example, the display 230 may display nine images in a form of a 3×3 matrix such that the user easily selects an image by using number buttons (0 to 9) of the control device 101, but is not limited thereto.

In response to the user input that failed to select all of the true images from the authentication image set, the display 230 according to an embodiment may output a new authentication image set. Also, the display 230 may output a message indicating a result of the user authentication.

When the display 230 is embodied as a touch screen, the display 230 may be used as an input device as well as an output device. For example, the display 230 may include at least one of a liquid crystal display, a thin-film transistor liquid-crystal display, an organic light-emitting diode, a flexible display, a 3-dimensional (3D) display, and an electrophoretic display. Also, according to an embodiment of the image display apparatus 100*a*, the image display apparatus 100*a* may include two or more displays 230.

Figure 3:
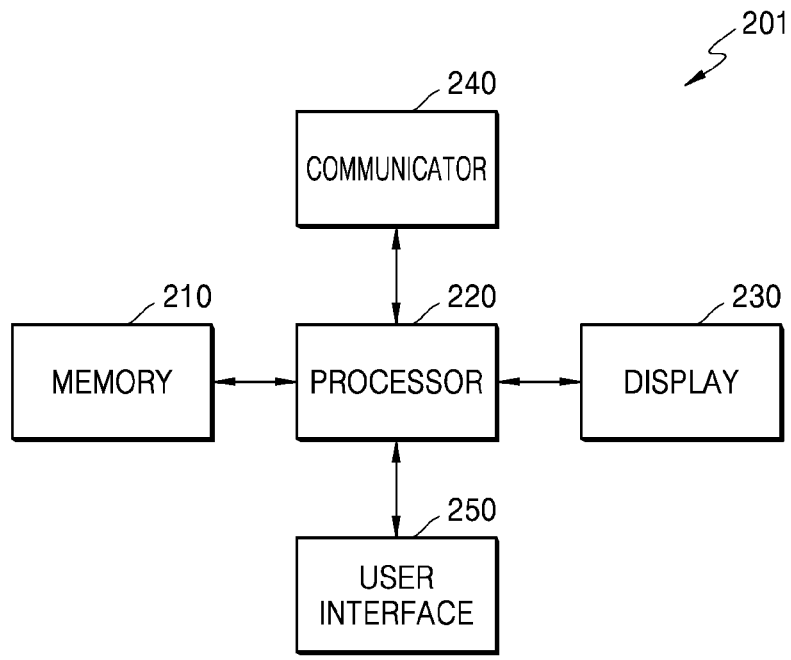
FIG. 3 is a block diagram of a configuration of an image display apparatus, according to another embodiment.

FIG. 3 is a block diagram of a configuration of an image display apparatus 201, according to another embodiment.

Referring to FIG. 3, like components denote like reference numerals as in FIG. 2. Thus, descriptions overlapping those of FIGS. 1 and 2 are omitted while describing the image display apparatus 201. Referring to FIG. 3, the image display apparatus 201 may further include a communicator 240 and a user interface 250 in addition to the components of the image display apparatus 100*a* of FIG. 2.

The communicator 240 may communicate with external apparatuses (not shown) via a wired or wireless network. In particular, the communicator 240 may transmit and receive data to and from the external apparatus connected via the wired or wireless network according to control of the processor 220. Here, the external apparatus may be a server or an electronic apparatus providing content displayed by the image display apparatus 201. For example, the external apparatus may be an apparatus capable of transmitting certain content to the image display apparatus 201, and may include a broadcasting station, a content providing server, or a content storing apparatus.

According to an embodiment, the first content and/or the second content may be received from the external apparatus through the communicator 240. Also, the communicator 240 may communicate with a server (not shown) capable of providing a true image and/or a false image via a wired or wireless network.

Also, according to an embodiment, the external apparatus connected to the communicator 240 may be a server or an electronic apparatus capable of recognizing an object from the true image and/or the false image and generating an image including the recognized object.

Also, the communicator 240 includes at least one communication module from among a short-distance communication module, a wired communication mobile, a mobile communication module, and a broadcast receiving module. Here, the at least one communication module denotes a tuner receiving a broadcast, Bluetooth, or a communication module capable of performing data transmission and reception through a network following the communication standard, such as wireless local area network (WLAN) (Wi-Fi), wireless broadband (WiBro), world interoperability for microwave access (WiMAX), CDMA, or WCDMA.

The user interface 250 may receive a user input for controlling the image display apparatus 201. The user interface 250 may include a user input device including a touch panel detecting a touch of the user, a button receiving a push operation of the user, a wheel receiving a rotation operation of the user, a keyboard, and a dome switch, but is not limited thereto. Also, when the image display apparatus 201 is manipulated by a remote controller (not shown), the user interface 250 may receive a control signal received from the remote controller.

According to an embodiment, the user interface 250 may receive a user input corresponding to the user authentication request. Also, the user interface 250 may receive a user input of selecting the at least one true image from the authentication image set.

Figure 4:
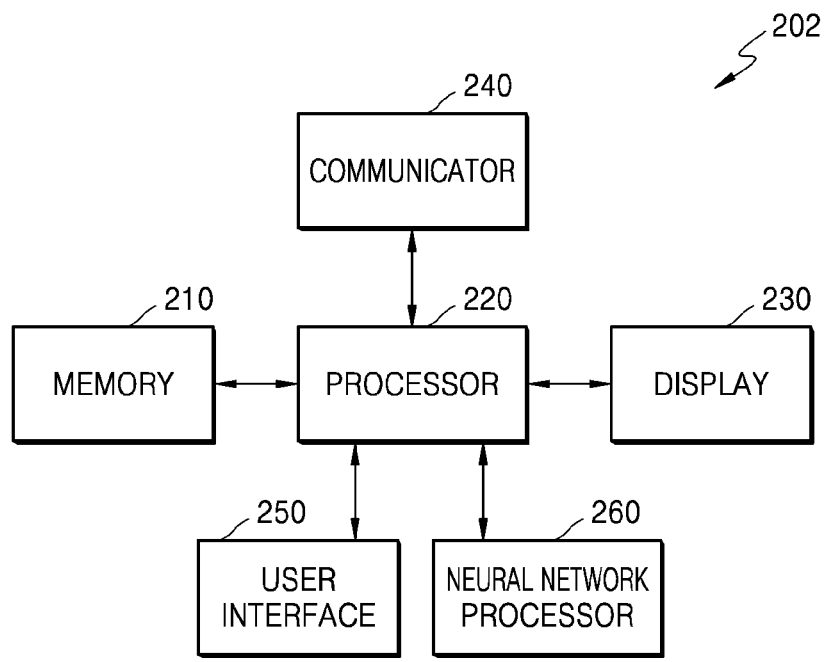
FIG. 4 is a block diagram of a configuration of an image display apparatus, according to another embodiment.

FIG. 4 is a block diagram of a configuration of an image display apparatus 202, according to another embodiment.

Referring to FIG. 4, like components denote like reference numerals as in FIG. 3. Thus, descriptions overlapping those of FIGS. 1 and 3 are omitted while describing the image display apparatus 202.

Referring to FIG. 4, the image display apparatus 202 may further include a neural network processor 260 in addition to the components of the image display apparatus 201 of FIG. 3.

In the image display apparatus 100*a* or 201, an operation of controlling a certain operation to be executed by performing an operation through a neural network is performed by the processor 220. The image display apparatus 202 according to the current embodiment may include the neural network processor 260 that is a separate processor for performing an operation through a neural network.

The neural network processor 260 may perform an operation through a neural network. In particular, in the current embodiment, the neural network processor 260 may perform an operation through a neural network by executing at least one instruction.

In particular, the neural network processor 260 may perform object recognition on a certain image by performing an operation through a neural network. For example, the neural network processor 260 may recognize at least one face in first content by performing an operation through a neural network.

Figure 5:
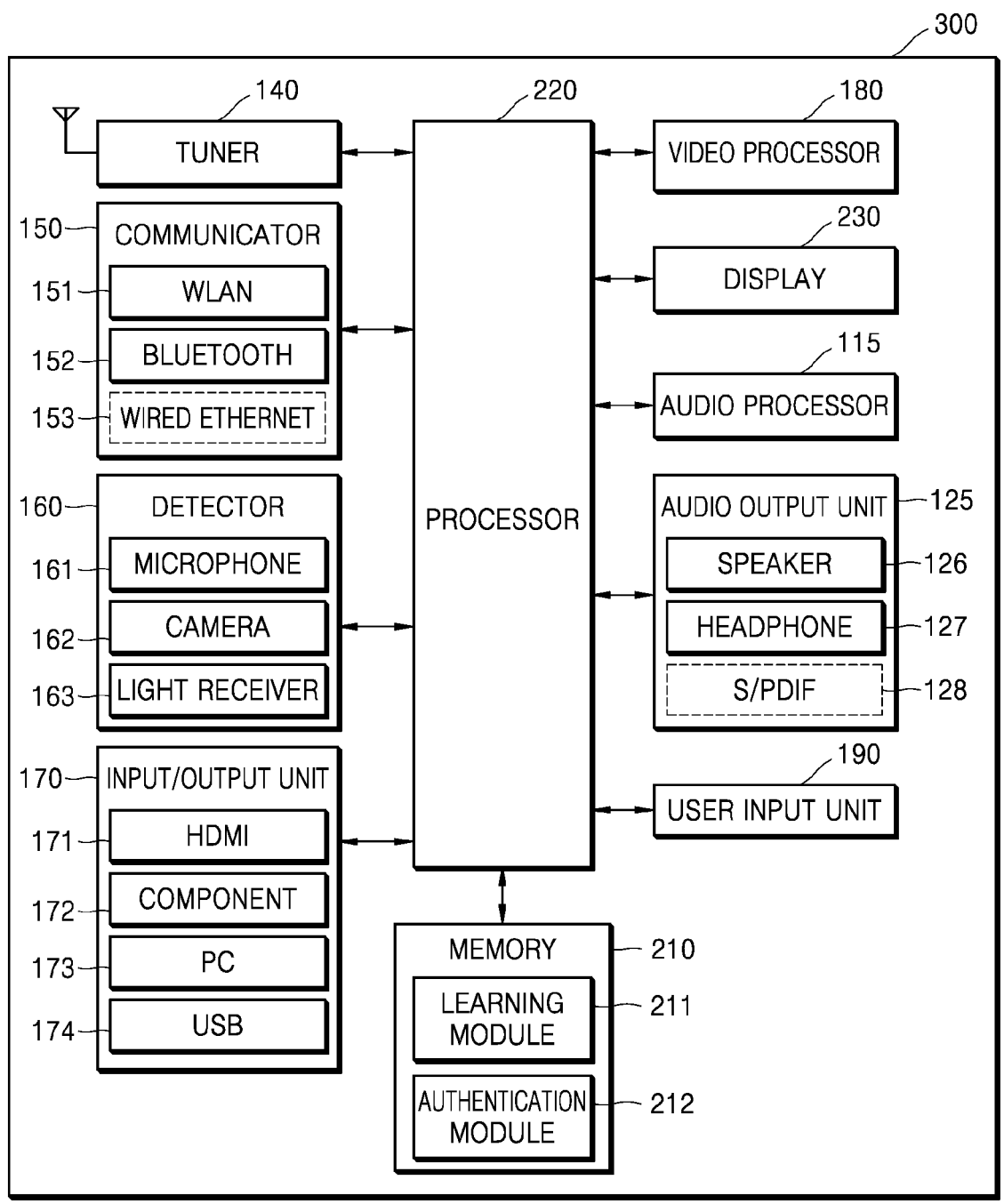
FIG. 5 is a block diagram of a configuration of an image display apparatus, according to another embodiment.

FIG. 5 is a block diagram of a configuration of an image display apparatus 300, according to another embodiment.

As shown in FIG. 5, the image display apparatus 300 may further include a tuner 140, a communicator 150, a detector 160, an input/output unit 170, a video processor 180, an audio processor 115, an audio output unit 125, and a user input unit 190, in addition to the memory 210, the processor 220, and the display 230.

Descriptions about the memory 210, processor 220, and display 230, which overlap those of FIG. 2 are omitted in FIG. 5. Also, the communicator 240 of FIG. 3 may correspond to eat least one of the tuner 140 and the communicator 150. Also, in addition to the components shown in FIG. 5, the image display apparatus 300 may further include a component corresponding to the user interface 250 of FIG. 3.

Accordingly, details overlapping those of FIGS. 1 to 4 are omitted while describing the image display apparatus 300 of FIG. 5.

The tuner 140 may tune and select only a frequency of a channel to be received by the image display apparatus 300 from various radio wave components by performing amplification, mixing, resonance, etc. on a broadcast signal received via wires or wirelessly. The broadcast signal may include audio, video, and additional information (for example, electronic program guide (EPG)).

The broadcast signal received through the tuner 140 is decoded (for example, audio-decoded, video-decoded, or additional information-decoded) to be separated into audio, video, and/or additional information. The separated audio, video, and/or additional information may be stored in the memory 210 according to control of the processor 220.

The number of tuners 140 of the image display apparatus 300 may be one or more. The tuner 140 may be embodied as an all-in-one with the image display apparatus 300, as a separate apparatus (for example, a set-top box) including a tuner electrically connected to the image display apparatus 300, or a tuner connected to the input/output unit 170.

The communicator 150 may connect the image display apparatus 300 to an external apparatus (for example, an audio apparatus) according to control of the processor 220. The processor 220 may transmit or receive content to or from the external apparatus through the communicator 150, download an application from the external apparatus, or perform web browsing.

The communicator 150 may include at least one of a WLAN 151, Bluetooth 152, and wired Ethernet 153 according to performance and structure of the image display apparatus 300. Also, the communicator 150 may include a combination of the WLAN 151, the Bluetooth 152, and the wired Ethernet 153. The communicator 150 may receive a control signal of the control device 101 according to control of the processor 220. The control signal may be a Bluetooth type, a radio frequency (RF) signal type, or a Wi-Fi type.

The communicator 150 may further include a short-distance communication module (for example, a near field communication (NFC) module) or a Bluetooth low energy (BLE) module, in addition to the Bluetooth 152.

The communicator 150 according to an embodiment may receive a learning model using at least one neural network from an external server. Also, the communicator 150 may receive new false images every pre-set period from the external server so as to update a false image stored in a database.

The detector 160 detects user's voice, a user's image, or a user's interaction, and may include a microphone 161, a camera 162, and a light receiver 163.

The microphone 161 receives voice uttered by the user. The microphone 161 may convert the received voice to an electric signal and output to the processor 220.

The camera 162 may receive an image (for example, continuous frames) corresponding to motion of the user including a gesture within a camera recognition range.

The light receiver 163 receives a light signal (including a control signal) received from the control device 101. The light receiver 163 may receive a light signal corresponding to a user input (for example, touching gesture, a pressing gesture, voice, or motion) from the control device 101. A control signal may be extracted from the received light signal according to control of the processor 220.

The light receiver 163 according to an embodiment may receive a light signal corresponding to a user input of selecting at least one image from an authentication image set, from the control device 101.

The input/output unit 170 receives video (for example, a moving image), audio (for example, voice or music), and additional information (for example, EPG) from an external source outside the image display apparatus 300, according to control of the processor 220. The input/output unit 170 may include at least one of a high-definition multimedia interface (HDMI) port 171, a component jack 172, a PC port 173, and a universal serial bus (USB) port 174. The input/output unit 170 may include a combination of the HDMI port 171, the component jack 172, the PC port 173, and the USB port 174.

The memory 210 according to an embodiment may store programs for processes and controls of the processor 220, and may store data input to or output from the image display apparatus 300. Also, the memory 210 may store data required for operations of the image display apparatus 300.

Also, the programs stored in the memory 210 may be distinguished into a plurality of modules according to functions. In particular, the memory 210 may store at least one program for performing a certain operation by using a neural network. For example, at least one program stored in the memory 210 may be distinguished into a learning module 211 and an authentication module 212.

The learning module 211 may include a learning module determined by learning a method of recognizing at least one object included in a plurality of training images in response to inputting of the plurality of training images to at least one neural network. The learning model may be received from an external server and stored in the learning module 211.

The authentication module 212 may store a program enabling the processor 220 to perform at least one instruction to perform user authentication by using an authentication image set. For example, the authentication module 212 may store programs that enable the processor 220 to control the display 230 to output an authentication image set including at least one true image and at least one false image selected respectively from a plurality of true images and a plurality of false images stored in the database in response to a user authentication request, and enable the processor 220 to perform user authentication in response to a user input of selecting at least one image from the authentication image set.

Also, at least one program for performing certain operations by using a neural network or at least one instruction for performing certain operations by using a neural network may be stored in an internal memory (not shown) of the processor 220.

The processor 220 controls overall operations of the image display apparatus 300, controls a signal flow between the components of the image display apparatus 300, and processes data. The processor 220 may execute an operating system (OS) and various applications stored in the memory 210 when a user input is received or a pre-set stored condition is satisfied.

The processor 220 according to an embodiment may execute at least one instruction stored in the memory 210 to recognize at least one object from first content displayed on the display 230 and viewed by a user by using a learning model using at least one neural network, store an image indicating the at least one object recognized from the first content in the database as a true image, control the display 230 to output an authentication image set including at least one true image and at least one false image selected respectively from a plurality of true images and a plurality of false images stored in the database in response to a user authentication request, and perform user authentication in response to a user input of selecting at least one image from the authentication image set.

Also, the processor 220 may include an internal memory (not shown). In this case, at least one of data, a program, and an instruction stored in the memory 210 may be stored in the internal memory of the processor 220. For example, the internal memory of the processor 220 may store at least one program for performing certain operations by using a neural network or at least one instruction for performing certain operations by using a neural network.

The video processor 180 may process image data to be displayed on the display 230, and perform various image processing operations, such as decoding, rendering, scaling, noise filtering, frame rate converting, and resolution converting, on the image data.

The display 230 may display a video included in the broadcast signal received through the tuner 140 according to control of the processor 220. Also, the display 230 may display content (for example, a moving image) input through the communicator 150 or the input/output unit 170. The display 230 may output an image stored in the memory 210 according to control of the processor 220.

The audio processor 115 processes audio data. The audio processor 115 may perform various processes, such as decoding, amplifying, and noise filtering, on the audio data.

The audio output unit 125 may output audio included in the broadcast signal received through the tuner 140, audio input through the communicator 150 or the input/output unit 170, or audio stored in the memory 210, according to control of the processor 220. The audio output unit 125 may include at least one of a speaker 126, a headphone output terminal 127, or Sony/Philips digital interface (S/PDIF) output terminal 128.

The user input unit 190 is a unit into which the user inputs data for controlling the image display apparatus 300. For example, the user input unit 190 may include a dome switch, a touch pad, a jog wheel, and a jog switch, but is not limited thereto.

Also, the user input unit 190 may be a component of the control device 101 described above or a component of the image display apparatus 300.

The user input unit 190 according to an embodiment may receive a user input of selecting at least one image from an authentication image set. For example, when the user input unit 190 is a keypad or a dome switch, the at least one image may be selected via an input of clicking or pressing a number key corresponding to an image of the authentication image set, or an input of clicking or pressing a direction key, but is not limited thereto.

Meanwhile, the block diagram of FIGS. 2 and 5 are only examples, and thus the components may be combined, a component may be added, or at least one of the components may be omitted according to actual specifications of the image display apparatuses 100a and 300. For example, two components may be combined to one component or one component may be divided into two components when necessary. Also, functions performed by each component are for describing the embodiments, and detailed operations or devices do not limit the range of the present disclosure.

Figure 6:
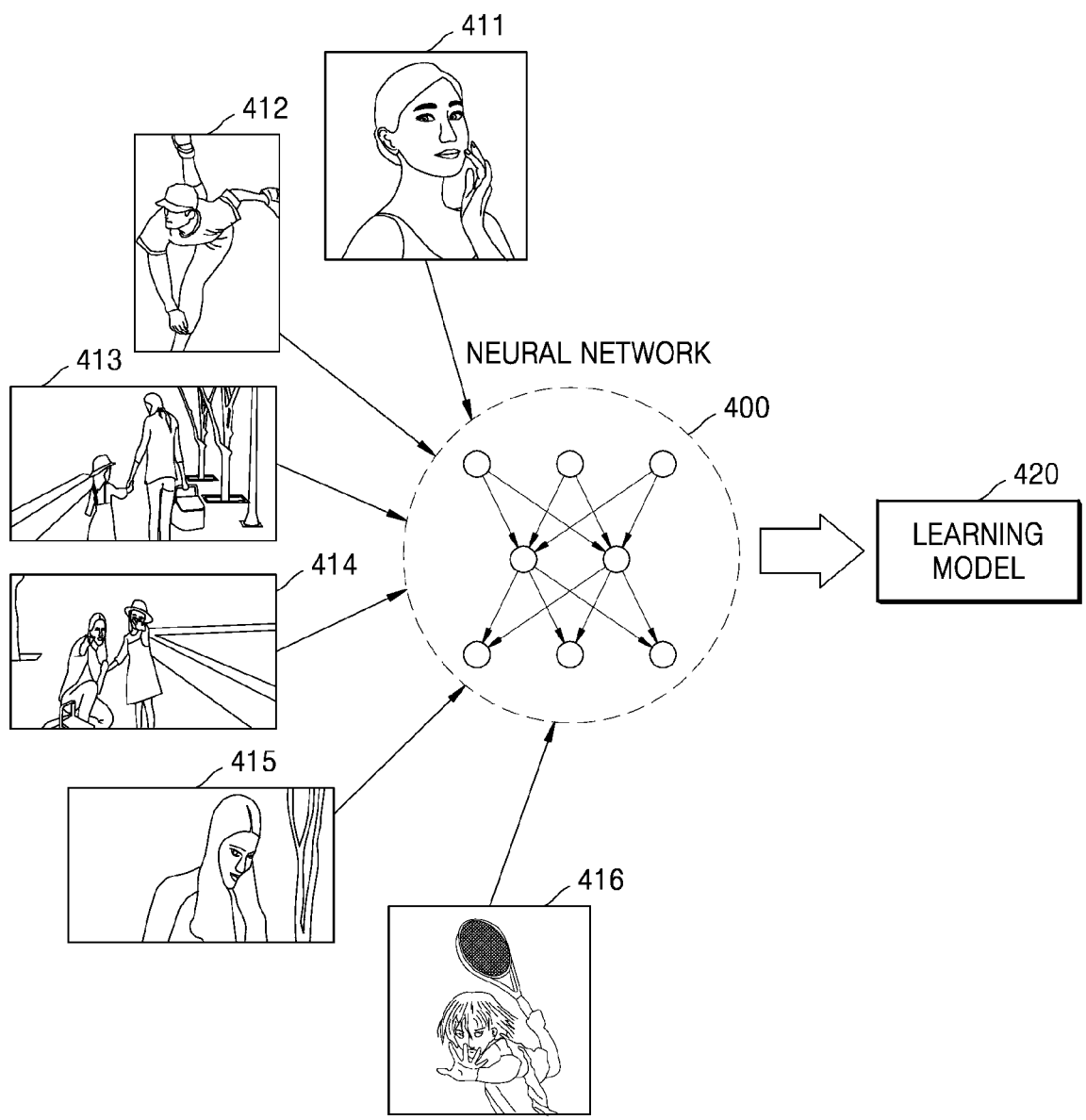
FIG. 6 is a diagram of an example of a neural network learning a method of recognizing an object from an image, according to an embodiment.

FIG. 6 is a diagram of an example of a neural network 400 learning a method of recognizing an object from an image, according to an embodiment.

Referring to FIG. 6, the neural network 400 may lean a method of recognizing an object from an image by using a plurality of training mages 411 to 416 as input values.

For example, the neural network 400 may learn a method of recognizing a face from the plurality of training images 411 to 416. Here, the plurality of training images 411 to 416 may include an image, a pictorial image, and a commercial image extracted from a plurality of pieces of moving image content (for example, a series, a sports game, a movie, etc.) viewed by the user through the image display apparatus 100, but are not limited thereto.

The neural network 400 may learn a method of recognizing at least one object included in the plurality of training images 411 to 416 in response to inputting of the plurality of training images 411 to 416, and a learning model 420 may be generated based on learning results.

Here, the learning model 420 may be a leaned neural network itself capable of obtaining target results through the neural network 400. In particular, for object recognition, the neural network 400 is trained by using the plurality of training images 411 to 416 to set values of a plurality of weights applied respectively to a plurality of nodes forming the neural network 400. Here, the weight may denote intensity of connection between the nodes of the neural network 400. The value of weight may be optimized through repetitive learning, and a result may be repeatedly amended until accuracy satisfies certain reliability. The learning model 420 may be a neural network formed by the values of finally set weights.

According to some embodiments, an operation of learning a method of recognizing an object from an image by using the neural network 400 may be per-performed. Also, the learning model 420 may be updated when some of the plurality of training images 411 to 416 are changed. For example, when the user views content through the image display apparatus 100, an image extracted from the viewed content may be used as a training image. Also, at least one image may be extracted from content viewed by the user in units of certain cycles (for example, 24 hours), and the extracted at least one image may be used as a training image. When a new training image is added, the neural network 400 may learn a method of recognizing an object from an image again, and accordingly, the learning model 420 may be updated.

Also, the operation of learning the method of recognizing an object from an image by using the neural network 400 may be performed by the image display apparatus 100, or according to an embodiment, may be performed by an external server. For example, the operation of learning the method of recognizing an object from an image by using the neural network 400 may require a relatively complex computation. Accordingly, computations to be performed by the image display apparatus 100 may be reduced when the external server performs the operation of learning and the image display apparatus 100 receives the learning model 420 from the external server. The image display apparatus 100 may pre-receive and store, in a memory, the learning model 420 from the external server, and recognize at least one object from an image by using the stored learning model 420.

Also, according to another embodiment, the image display apparatus 202 may include the neural network processor 260 that is a separate exclusive processor that performs a learning operation through the neural network 400. Also, the neural network processor 260 may determine the learning model 420 via learning through the neural network 400, and recognize an object through the determined learning model 420.

Operations performed through the neural network 400 will be described additionally later with reference to FIG. 23.

Hereinafter, detailed operations performed according to one or more embodiments will be described with reference to the image display apparatus 201 of FIG. 3.

Figure 7:
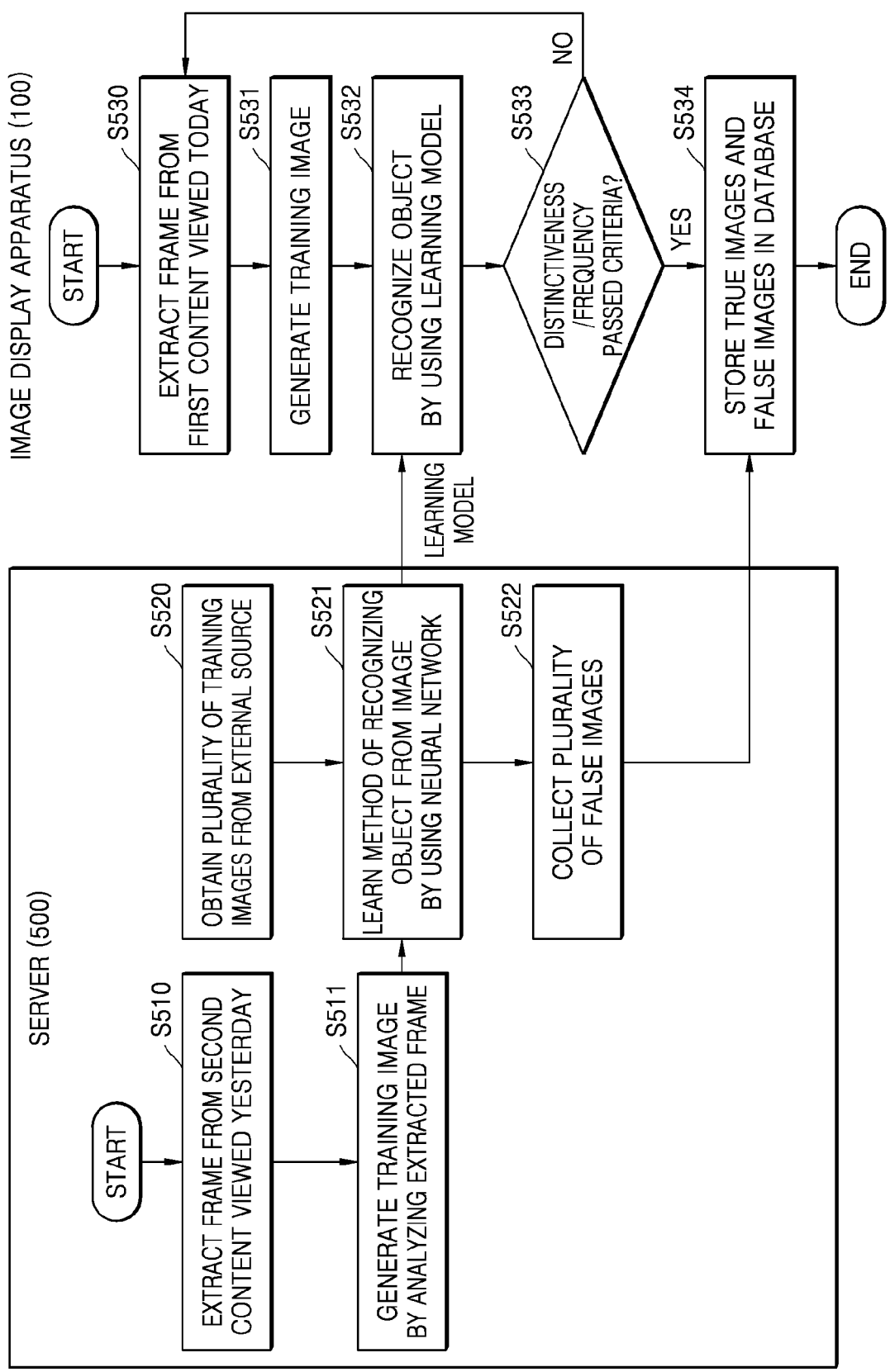
FIG. 7 is a flowchart of processes of an image display apparatus generating an image database used in user authentication, according to an embodiment.

FIG. 7 is a flowchart of processes of generating a database used in user authentication, according to an embodiment. Also, the server 500 of FIG. 7 may be a server capable of performing object recognition through a neural network. The server 500 may be provided separately from the image display apparatus 100 and connected to the communicator 240 of the image display apparatus 201.

Referring to FIG. 7, in operation S510, the server 500 may extract at least one unit image from second content viewed by the user yesterday. Here, the unit image may be a frame, a scene, or a group of pictures (GoP). Hereinafter, for convenience of description, it is described that the unit image is a frame. The second content may be content viewed a pre-set time before a point of time when a user authentication request is received, and is not limited to content viewed by the user yesterday. Moving image content includes a plurality of frames, and in order to collect a false image, the image display apparatus 201 may extract at least one frame from the second content. Here, the image display apparatus 201 may capture a frame of the second content in pre-set time units, but is not limited thereto.

In operation S511, the server 500 may generate a training image by analyzing the frame extracted from the second content. For example, the image display apparatus 201 may determine whether a face of a person appears in the frame by analyzing the frame, and generate a training image based on the frame in which the face appears. The generated training image may be an image obtained by capturing a certain frame of the second content or an image in which the image obtained by capturing the certain frame of the second content is edited according to a certain standard, but is not limited thereto.

Also, in operation S520, the server 500 according to an embodiment may obtain a plurality of training images from an external source. For example, the plurality of training images may be an image pr-stored in the server 500 and an image received from an external apparatus, but are not limited thereto. The server 500 may pre-receive the plurality of training images from the external apparatus, and update the plurality of training images by receiving a new training image every pre-set period from the external apparatus.

In operation S521, the server 500 may learn a method of recognizing an object from an image by using at least one neural network. The method of recognizing an object from an image may be learned in response to inputting of a plurality of training images obtained by the at least one neural network and a training image generated based on the second content, and a learning model may be generated based on a result of learning the method. The server 500 may transmit the generated learning model to the image display apparatus 201, and the image display apparatus 201 may collect a true image to be stored in the database by using the received learning model.

In operation S522, the server 500 may obtain a plurality of false image. In detail, the server 500 may recognize at least one object from the training image generated based on the second content or the plurality of training images by using the learning model using the at least one neural network, and obtain an image indicating the at least one object, which is recognized from the training image generated based on the second content or the plurality of training images, in the database as a false image. For example, when the learning model recognizes a face of a person, the learning model may determine whose face the recognized face is. The false image is an image extracted from the second content (for example, the image obtained by capturing the frame of the second content), and may be an image including a face recognized from the second content. Alternatively, the false image may be a commercial image or a pictorial image of a person corresponding to the face recognized from the second content, but is not limited thereto.

In operation S530, the image display apparatus 201 may extract at least one frame from first content viewed today. The first content may be content viewed within a pre-set time from the point of time when the user authentication request is received (for example, content viewed within 6 hours), but is not limited to content viewed today. Also, the first content may be content viewed by the user most recently. Also, the first content may be the content viewed within the pre-set time from the point of time when the user authentication request is received when there is one, and may be the content viewed by the user most recently when there is no the content viewed within the pre-set time from the point of time when the user authentication request is received.

In operation S531, the image display apparatus 201 may generate a training image by analyzing the frame extracted from the first content. The generated training image may be an image obtained by capturing a certain frame of the first content or an image in which the image obtained by capturing the certain frame of the second content is edited according to a certain standard, but is not limited thereto.

In operation S532, the image display apparatus 201 may recognize at least one object from the training image generated based on the first content, by using the learning model received from the server 500. The learning model may be updated in the server 500 every pre-set period, and the image display apparatus 201 may receive the updated learning model from the server 500.

In operation S533, the image display apparatus 201 may determine at least one of whether the object recognized from the first content appears in the first content at least a pre-set number of times and whether the object recognized from the first content has distinctiveness. For example, when the object recognized from the first content is an object that frequently appears in a plurality of pieces of content, such as a streetlight, a bus, or a street tree, it may be difficult for the user to determine whether the object appeared in the first content. Accordingly, the image display apparatus 201 may store, as a true image, an image indicating an object having distinctiveness among the at least one object recognized from the first content such that the user easily determines the object appeared in the first content. For example, when the first content is a movie, the image display apparatus 201 may recognize faces of main characters in the first content, but is not limited thereto.

In operation S534, the image display apparatus 201 may store a plurality of true images and a plurality of false images in the database. The image display apparatus 201 may use the plurality of true images and the plurality of false images stored in the database to perform user authentication. For example, in response to the user authentication request, the image display apparatus 201 may output an authentication image set including at least one true image and at least one false image selected respectively from the plurality of true images and the plurality of false images stored in the database. Also, the image display apparatus 201 may perform the user authentication in response to a user input of selecting at least one image from the authentication image set.

Figure 8:
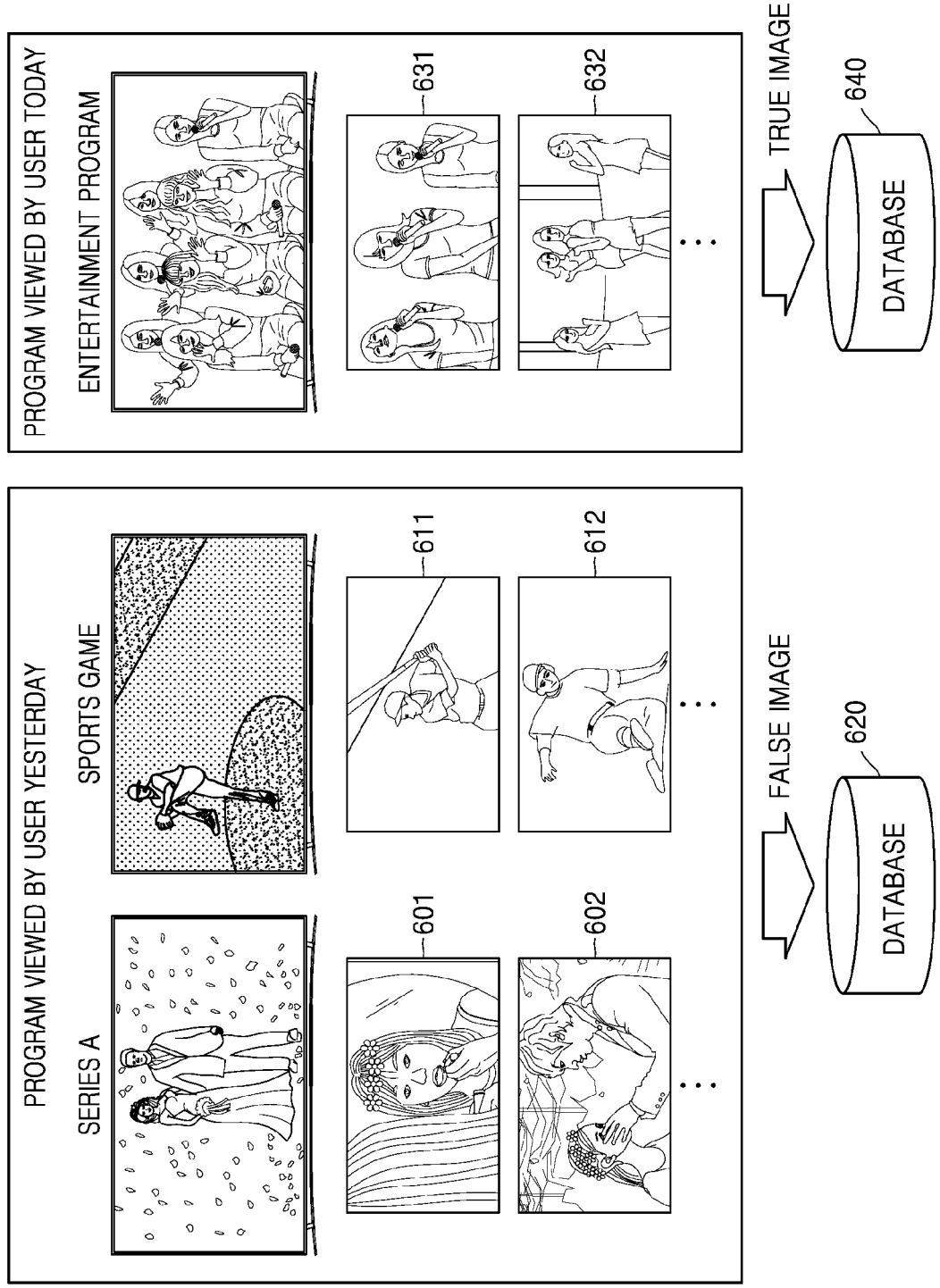
FIG. 8 is a diagram of an example of an image display apparatus collecting a true image and a false image used in user authentication, according to an embodiment.

FIG. 8 is a diagram of an example of the image display apparatus 201 collecting a true image and a false image used in user authentication, according to an embodiment.

The image display apparatus 201 according to an embodiment may store, as a true image, an image indicating at least one object recognized from first content viewed within a pre-set time (for example, 3 hours or 6 hours) from a point of time when a user authentication request is received, in a database.

For example, the image display apparatus 201 may extract at least one image from the first content viewed within 3 hours from the point of time when the user authentication request is received. The image display apparatus 201 may store an image indicating at least one object recognized from the extracted at least one image in the database as a true image. Here, the true image may be an image including a scene extracted from the first content or an image extracted from another piece of content and including the extracted at least object, but is not limited thereto. Also, according to an embodiment, the image display apparatus 201 may extract at least one image from the first content viewed by the user on a day when the user authentication request is received, but is not limited thereto.

Referring to FIG. 8, the image display apparatus 201 may extract images 631 and 632 from an entertainment program viewed by the user on a day when a user authentication request is received. The image display apparatus 201 may recognize at least one object from the extracted images 631 and 632 by using a learning model using at least one neural network, and store an image indicating the recognized at least one object in a database 640 as a true image. For example, the image display apparatus 201 may recognize at least one face from the extracted images 631 and 632, and store an image indicating a person corresponding to the recognized at least one face in the database 640 as a true image, but is not limited thereto.

Also, the image display apparatus 201 according to an embodiment may store, as a false image, an image indicating at least one object recognized from second content viewed a pre-set time before the point of time when the user authentication request is received. For example, the image display apparatus 201 may extract at least one image from the second content viewed 24 hours before the point of time when the user authentication request is received, and store, as a false image, an image indicating at least one object recognized from the extracted at least one image in a database 620. Alternatively, according to an embodiment, the image display apparatus 201 may extract at least one image from the second content viewed before the day when the user authentication request is received, but is not limited thereto.

For example, referring to FIG. 6, the image display apparatus 201 may extract images 601, 602, 611, and 612 from a series A and a sports game viewed before the day when the user authentication request is received. The image display apparatus 201 may recognize at least one object from the extracted images 601, 602, 611, and 612 by using a learning model using at least one neural network, and store an image indicating the recognized at least one object in the database 620 as a false image. For example, the image display apparatus 201 may recognize at least one face from the extracted at least one image 601, 602, 611, and 612, and store an image indicating a person corresponding to the recognized at least one face in the database 620 as a false image, but is not limited thereto.

Figure 9:
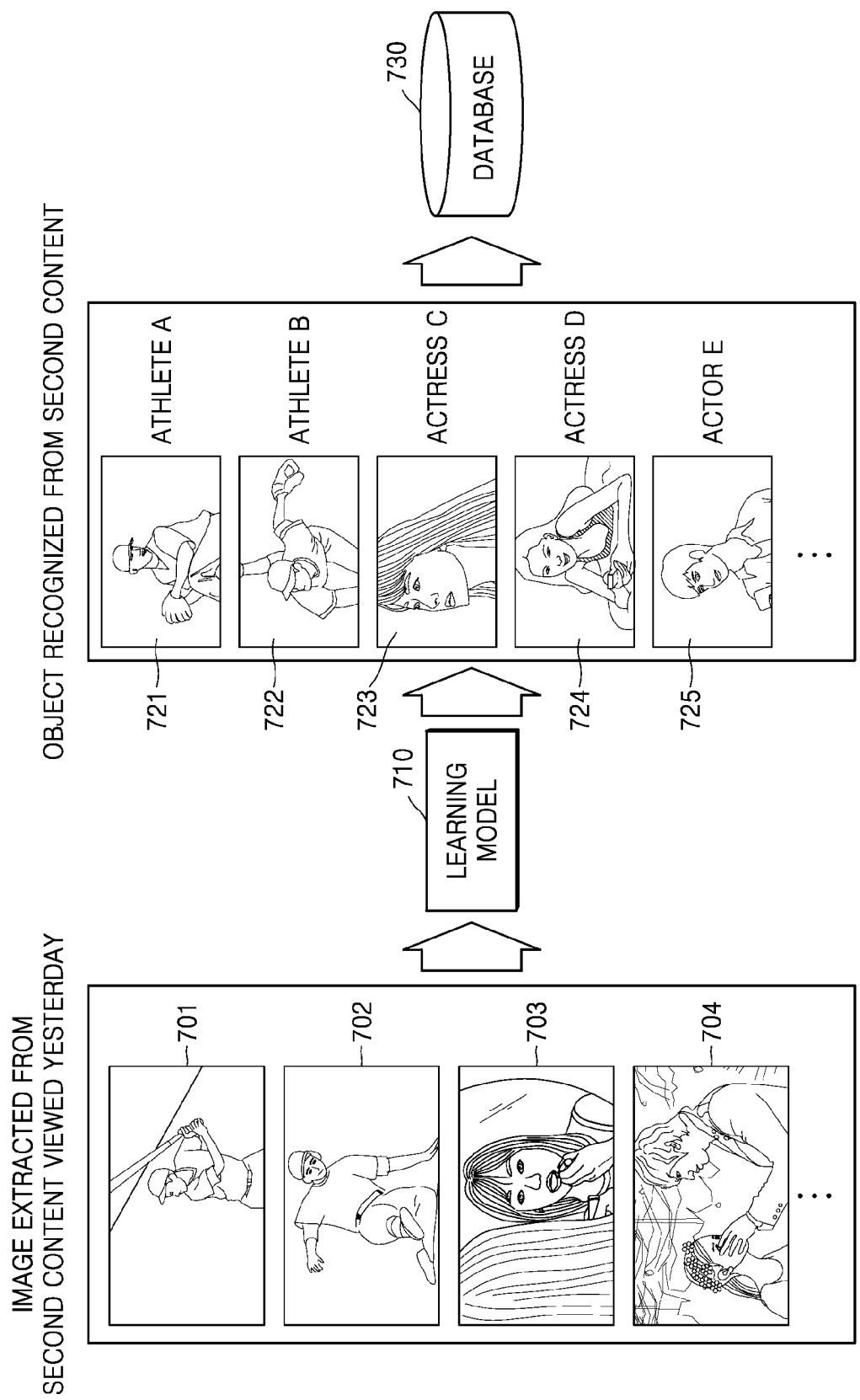
FIGS. 9 and 10 are diagrams for describing processes of an image display apparatus collecting a true image and a false image, according to an embodiment.
Figure 10:
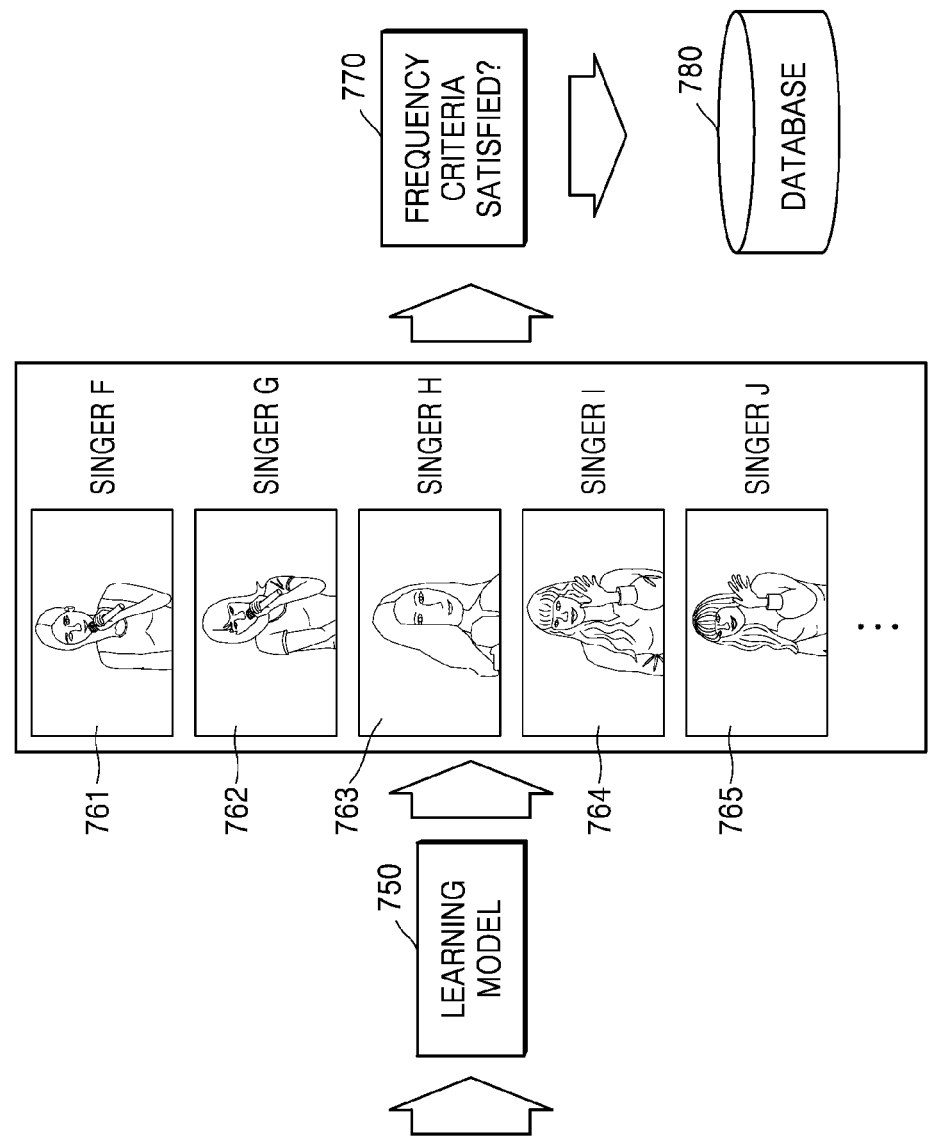

FIGS. 9 and 10 are diagrams for describing processes of the image display apparatus 201 collecting a true image and a false image, according to an embodiment.

The image display apparatus 201 according to an embodiment may store an image indicating at least one object recognized from second content viewed a pre-set time before a point of time when a user authentication request is received in a database as a false image.

For example, referring to FIG. 9, the image display apparatus 201 may extract images 701 through 704 from second content viewed before a day when the user authentication request is received. Here, the second content may include at least one piece of content viewed by a user before the day when the user authentication request is received. The image display apparatus 201 may recognize at least one object from the images 701 through 704 extracted from the second content, by using a learning model 710 using at least one neural network. Here, the recognized at least one object may include a face of a person, but is not limited thereto. For example, the image display apparatus 201 may recognize an athlete A 721, an athlete B 722, an actress C 723, an actress D 724, and an actor E 725 from the images 701 through 703 extracted from the second content. The image display apparatus 201 may store images indicating the athlete A 721, the athlete B 722, the actress C 723, the actress D 724, and the actor E 725 in a database 730 as false images. Here, the false images are images including the athlete A 721, the athlete B 722, the actress C 723, the actress D 724, and the actor E 725, and may include an image extracted from the second content or extracted from another piece of content. For example, the false images may include an image obtained by extracting a scene where the athlete A 721 appeared from the second content or an image extracted from another sports game where the athlete A 721 appeared. Also, according to an embodiment, the false images may include commercial images and pictorial images where the athlete A 721, the athlete B 722, the actress C 723, the actress D 724, and the actor E 725 appear, but are not limited thereto.

The image display apparatus 201 according to an embodiment may store an image indicating at least one object recognized from first content viewed within a pre-set time from a point of time when a user authentication request is received in a database as a true image.

For example, referring to FIG. 10, the image display apparatus 201 may extract images 741 through 743 from first content viewed by the user on a day when a user authentication request is received. Then, the image display apparatus 201 may recognize at least one object from the images 741 through 743 extracted from the first content by using a learning model 750 using at least one neural network. For example, the image display apparatus 201 may recognize singers F through J 761 through 765 from the images 741 through 743 extracted from the first content.

The image display apparatus 201 according to an embodiment may consider appearing frequency of an object in the first content (770). In detail, the image display apparatus 201 according to an embodiment may store an image indicating an object appearing in the first content at least a pre-set number of times from among the at least one object recognized from the first content in a database 780 as a true image. For example, the image display apparatus 201 may recognize at least one object from a plurality of frames forming the first content, and store an image indicating an object included in the plurality of frames at least a pre-set number of times among the recognized at least one object in the database 780 as a true image.

When the first content viewed by the user is a movie, it may be difficult for the user to identify all characters in the movie. For example, it may be difficult for the user to identify a character appearing only in one scene of the movie. Accordingly, the image display apparatus 201 may store an image indicating a character appeared in the movie at least a pre-set number of times among the characters recognized in the movie in the database 780 as a true image. Accordingly, the image display apparatus 201 may increase reliability of a user authentication result by storing, as a true image, an image indicating a character having relatively high importance in the movie.

FIGS. 8A and 8B are an example of the image display apparatus 201 performing user authentication by using an authentication image set, according to an embodiment.

Referring to FIG. 8A, the image display apparatus 201 according to an embodiment may output an authentication image set including true images 801 through 803 and at least one false image selected respectively from a plurality of true images and a plurality of false images stored in a database, in response to a user authentication request.

For example, the image display apparatus 901 may display the authentication image set including 9 images such that a user easily selects at least one image from the authentication image set by using a number key of the control device 101. The authentication image set may be displayed in a grid form as shown in FIG. 8A, but is not limited thereto.

Figure 11:
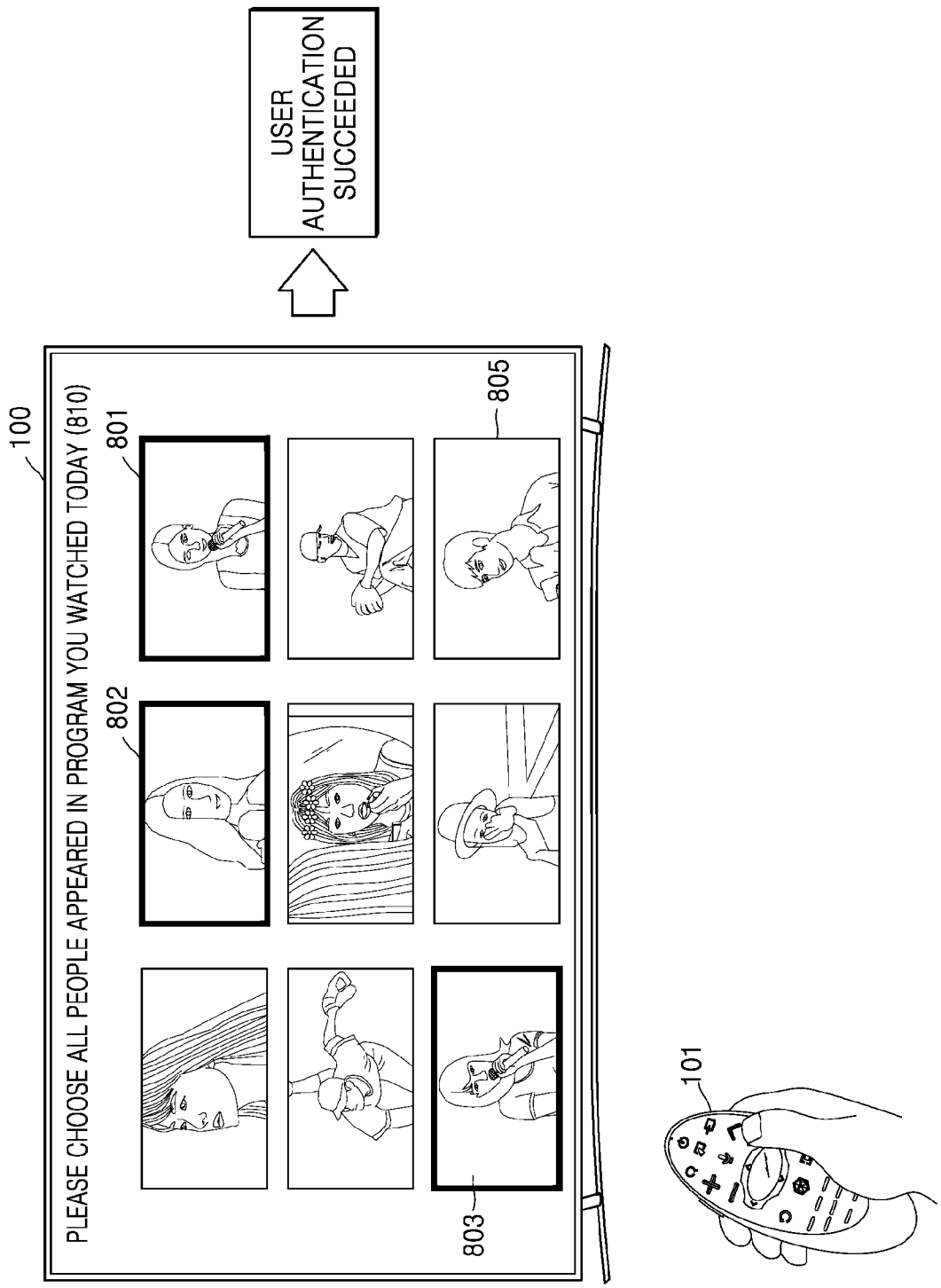
FIGS. 11 and 12 are an example of an image display apparatus performing user authentication by using an authentication image set, according to an embodiment.
Figure 12:
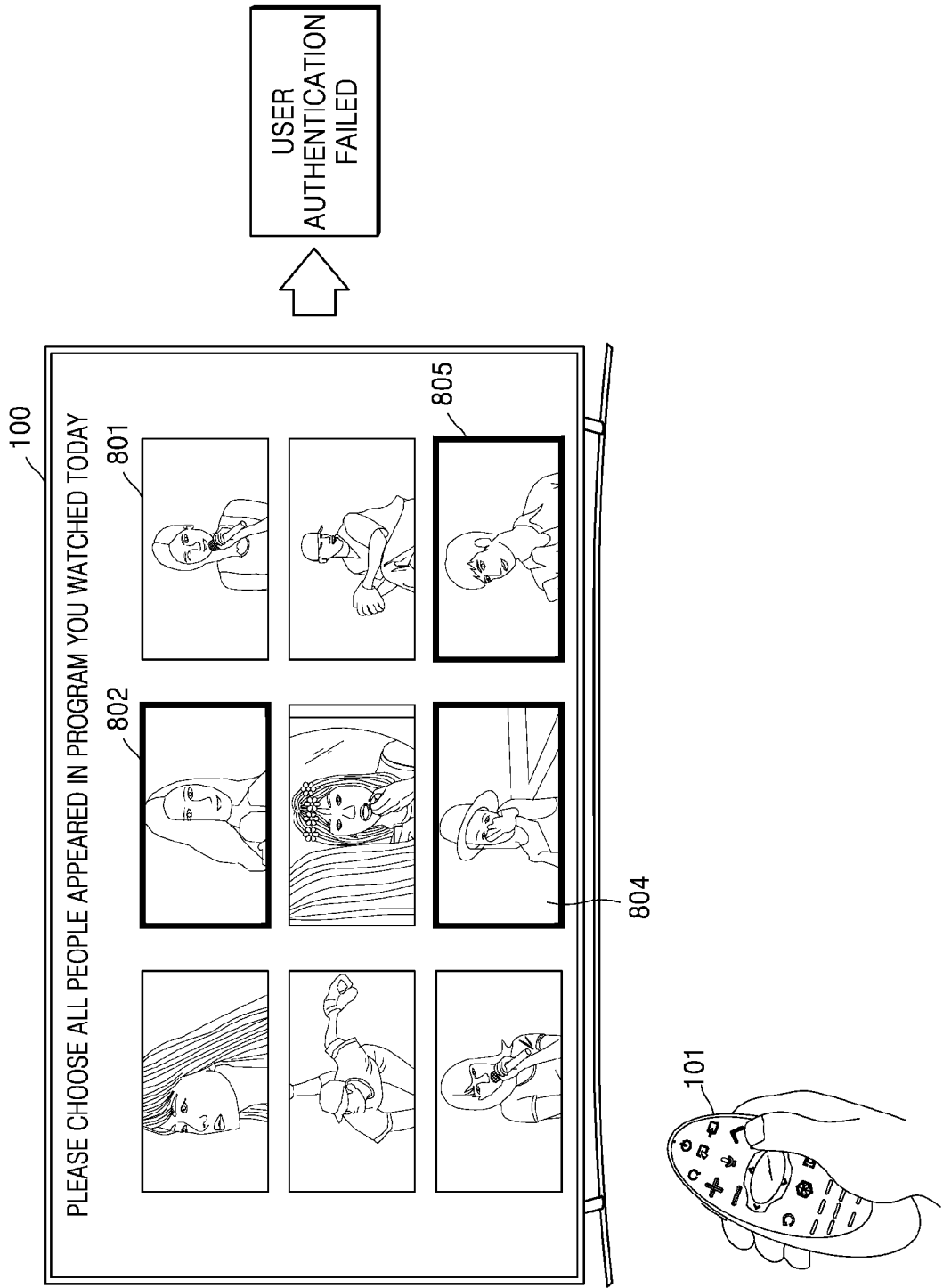

The image display apparatus 201 according to an embodiment may map each image forming an authentication image set to a number such that the user may easily select at least one image from the authentication image set by selecting a number key of the control device 101. For example, as shown in FIG. 11, when the authentication image set includes 9 images, the image display apparatus 201 may map the images to 1 to 9 according to locations where the images are displayed.

The image display apparatus 201 according to an embodiment may display the authentication image set together with a message 810 notifying the user to select all true images, in response to the user authentication request. For example, as shown in FIG. 8A, when the authentication image set is output together with the message 810 of "please choose all people appeared in program you watched today", the user may select the true images 801 through 803 indicating people appeared in content viewed today to succeed in user authentication.

The image display apparatus 201 according to an embodiment may determine the user as an authorized user in response to a user input of selecting all of the true images 801 through 803 from the displayed authentication image set.

However, when the user is unable to select all of the true images 801 through 803 from the authentication image set, the image display apparatus 201 may determine the user as an unauthorized user. For example, referring to FIG. 8B, when the user selects the true image 802 and two false images 804 and 805, the image display apparatus 201 may determine that the user authentication is failed, and display a new authentication image set again. Also, when the user authentication is failed at least a pre-set number of times, the image display apparatus 201 may determine that the user is an unauthorized user and output a message indicating that the user authentication is failed.

Figure 13:
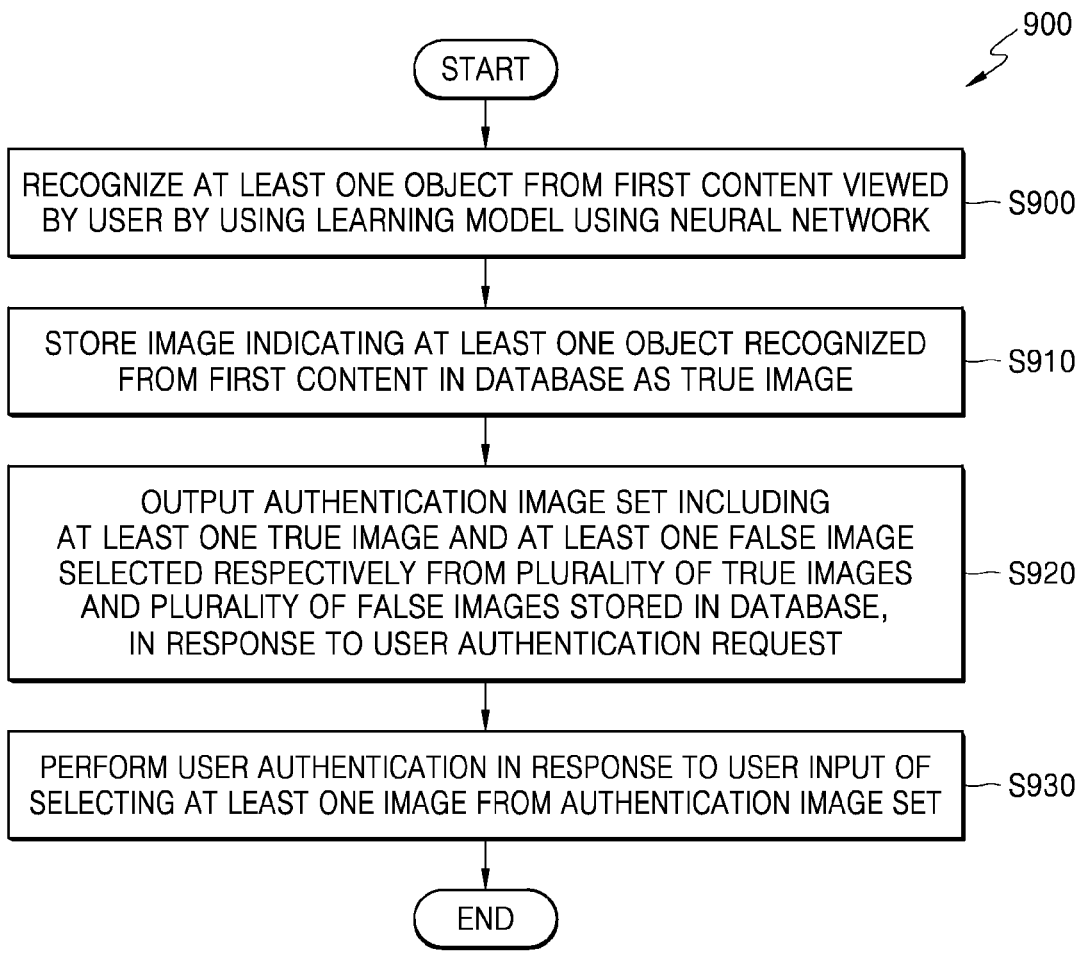
FIG. 13 is a flowchart of an operating method of an image display apparatus, according to an embodiment.

FIG. 13 is a flowchart of an operating method 900 of an image display apparatus, according to an embodiment. The operating method 900 of FIG. 13 may include operations performed by an image display apparatus according to one or more embodiments (for example, the image display apparatus 100, 100a, 201, 202, or 300) described with reference to FIGS. 1 through 8B. Accordingly, descriptions about operations of the operating method 900, which overlap those described above with reference to the image display apparatus 100, 100a, 201, 202, or 300, will not be provided again.

For convenience of description, the operating method 900 will be described with reference to the image display apparatus 201.

In operation S900, the image display apparatus 201 recognizes at least one object from first content output on the display 230 of the image display apparatus 201 and viewed by a user, by using a learning model using at least one neural network. In particular, operation S900 may be performed according to control of the processor 220. Also, object recognition and/or an operation of obtaining a learning model for object recognition in operation S900 may be performed by the server 2000 that will be described with reference to FIGS. 17 and 18.

For example, the image display apparatus 201 may recognize at least one face appeared in the first content by using the learning model using the at least one neural network, and according to an embodiment, the processor 220 may recognize at least one thing (for example, a vehicle, a bag, or an electronic apparatus) appeared in the first content. The first content may denote content viewed within a pre-set time from a point of time when a user authentication request is received, among a plurality of pieces of content viewed by the user.

In operation S901, the image display apparatus 201 may store an image indicating the at least one object recognized from the first content in a database as a true image.

The image display apparatus 201 may store, as the true image, an image indicating an object recognized from content viewed within a pre-set time (for example, within 3 hours) from a point of time when a user authentication request is received. The image indicating the at least one object recognized from the first content may include an image extracted from the first content, or an image extracted from another piece of content in which the object recognized from the first content appears. For example, the image display apparatus 201 may recognize at least one face from the first content and store, as the true image, an image indicating a person corresponding to the recognized at least one face in the database. Here, the image display apparatus 201 may also store information about the object recognized from the image. For example, when the face recognized from the first content is an actress A, the image display apparatus 201 may store an image including the actress A as a true image while also storing information indicating that the image is about the actress A. For example, the image display apparatus 201 may store the information indicating the actress A as tag information of the image, but is not limited thereto.

In operation S920, the image display apparatus 201 outputs an authentication image set including at least one true image and at least one false image selected respectively from a plurality of true images and a plurality of false images stored in the database, in response to the user authentication request.

The number of images included in the authentication image set may vary according to embodiments. For example, the image display apparatus 201 may display 9 images in a form of a 3×3 matrix such that the user easily selects an image by using number buttons (0 to 9) of the control device 101, but is not limited thereto.

The image display apparatus 201 may update the false image stored in the database every pre-set period (for example, once every day). When the false image stored in the database is fixed, an electronic apparatus controlled by an external user who is not authorized may learn the fixed false image. Accordingly, the image display apparatus 201 may update the false image stored in the database every pre-set period so as to effectively identify a user having proper authority.

In operation S930, the image display apparatus 201 may perform user authentication in response to a user input of selecting at least one image from the authentication image set.

The image display apparatus 201 according to an embodiment may determine the user as an authorized user in response to a user input of selecting all of the at least one true image from the authentication image set.

Also, when the user fails to select all of the at least one true image from the authentication image set, the image display apparatus 201 may determine that the user authentication is failed and display a new authentication image set. According to an embodiment, when the user selects at least a pre-set number of the at least one true image included in the authentication image set, the image display apparatus 201 may determine that the user is an authorized user. For example, when the authentication image set includes 4 true images, the image display apparatus 201 may determine that the user is an authorized user when the user selects at least 3 true images, but an embodiment is not limited thereto.

Figure 14:
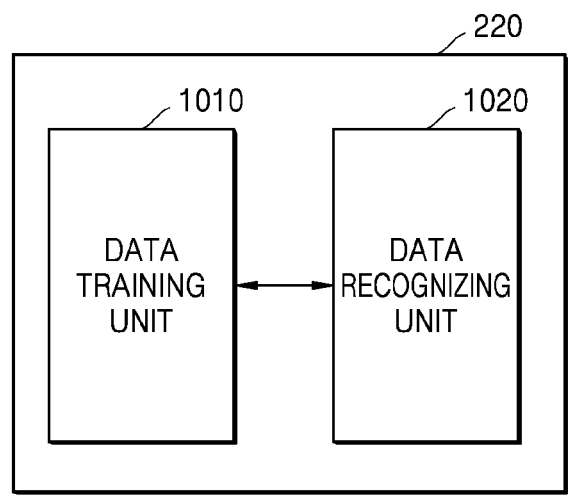
FIG. 14 is a block diagram of a configuration of a processor, according to an embodiment.

FIG. 14 is a block diagram of a configuration of the processor 220, according to an embodiment.

Referring to FIG. 14, the processor 220 according to an embodiment may include a data training unit 1010 and a data recognizing unit 1020.

The data training unit 1010 may learn a standard for recognizing an object from an image. The data training unit 1010 may learn a standard about which information of an image is used to determine an object from an image. Also, the data training unit 1010 may learn a standard about how an object is recognized by using information of an image. The data training unit 1010 may obtain data to be used for learning and apply the obtained data to a data determination model described later to learn a standard for determining a state of a user.

The data recognizing unit 1020 may recognize at least one object from an image and output a result of the recognizing. The data recognizing unit 1020 may recognize at least one object from a certain image by using the learned data determination model. The data recognizing unit 1020 may obtain data according to a pre-set standard which is set via learning, and use the obtained data as an input value of the data determination model. Also, the data recognizing unit 1020 may recognize at least one object from the obtained image by using the data determination model. Also, a result value output by the data determination model by using an obtained image as an input value may be used to update the data determination model.

At least one of the data training unit 1010 and the data recognizing unit 1020 may be manufactured as at least one hardware chip and mounted on an electronic apparatus. For example, at least one of the data training unit 1010 and the data recognizing unit 1020 may be manufactured in a form of an exclusive hardware chip for AI or manufactured as a part of a general-purpose processor (for example, a CPU or an application processor) or a graphic-exclusive processor (for example, a GPU), and mounted on the electronic apparatus.

In this case, the data training unit 1010 and the data recognizing unit 1020 may be mounted on one electronic apparatus or on individual electronic apparatuses. For example, one of the data training unit 1010 and the data recognizing unit 1020 may be included in an electronic apparatus and the other one may be included in a server. Also, model information built by the data training unit 1010 may be provided to the data recognizing unit 1020 and data input to the data recognizing unit 1020 may be provided to the data training unit 1010 as additional training data, via wires or wirelessly.

Meanwhile, at least one of the data training unit 1010 and the data recognizing unit 1020 may be embodied as a software module. When at least one of the data training unit 1010 and the data recognizing unit 1020 is embodied as a software module (or a program module including an instruction), the software module may be stored in a non-transitory computer-readable medium. Also, in this case, the at least one software module may be provided by an operating system (OS) or a certain application. Alternatively, a part of the at least one software module may be provided by OS and the remaining part may be provided by a certain application.

Figure 15:
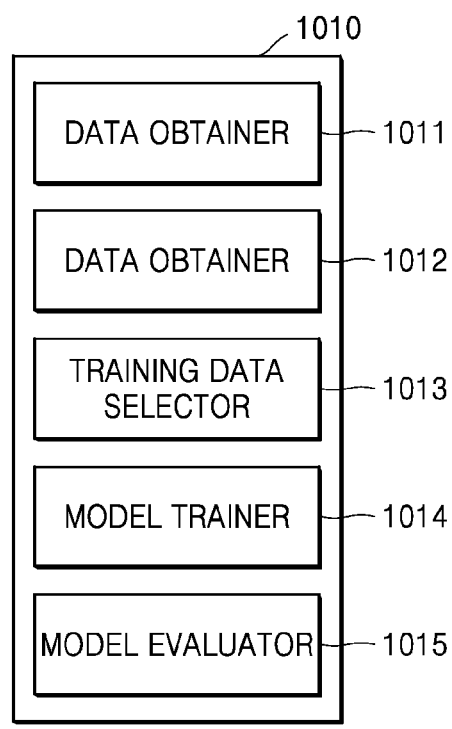
FIG. 15 is a block diagram of a configuration of a data training unit, according to an embodiment.

FIG. 15 is a block diagram of a configuration of the data training unit 1010, according to an embodiment.

Referring to FIG. 15, the data training unit 1310 according to an embodiment may include a data obtainer 1011, a pre-processor 1012, a training data selector 1013, a model trainer 1014, and a model evaluator 1015.

The data obtainer 1011 may obtain data required for learning of recognizing an object from an image. The data obtainer 1011 may obtain the data from an external server, such as a social network server, a cloud server, or a content providing server.

The data obtainer 1011 may obtain an image required for learning of recognizing an object from an image. For example, the data obtainer 1011 may obtain an image from at least one external apparatus connected to the image display apparatus 201 through a network, and may obtain the image by extracting at least one scene from content viewed by a user.

The pre-processor 1012 may pre-process obtained data such that the data is used for learning of recognizing at least one object from an image. The pre-processor 1012 may process the data to a pre-set format such that the model trainer 1014 described later uses the data obtained for learning of recognizing at least one object from an image. For example, the pre-processor 1012 may analyze an obtained image to detect attribute information of the image, but an embodiment is not limited thereto.

The training data selector 1013 may select data required for learning among the pre-processed data. The selected data may be provided to the model trainer 1014. The training data selector 1013 may select data required for learning among the pre-processed data, according to a pre-set standard for recognizing an object from an image. Also, the training data selector 1013 may select data according to a standard pre-set via learning by the model trainer 1014 described later.

The model trainer 1014 may learn a standard of which training data is to be used to recognize an object from an image. For example, the model trainer 1014 may learn types, numbers, or levels of image attributes used to recognize an object from an image.

Also, the model trainer 1014 may train a data determination model by using the training data, the data determination model being used to identify at least one object from an image. In this case, the data determination model may be a pre-built model. For example, the data determination model may be a model pre-built by receiving basic training data (for example, a sample image).

The data determination model may be built considering an application field of the data determination model, a training purpose, or a computer performance of an apparatus. The data determination model may be, for example, a neural network-based model. For example, a deep neural network (DNN), a recurrent neural network (RNN), or a bidirectional recurrent deep neural network (BRDNN) may be used as the data determination model, but an embodiment is not limited thereto.

According to an embodiment, when there are a plurality of pre-built data determination models, the model trainer 1014 may determine, as a data determination model to be trained, a data determination model having high relevance between input training data and basic training data. In this case, the basic training data may be pre-classified according to data types, and the data determination models may be pre-built according to data types. For example, the basic training data may be pre-classified according to various standards, such as a region where training data is generated, a time when training data is generated, a size of training data, a genre of training data, a generator of training data, and a type of object in training data.

Also, the model trainer 1014 may train, for example, the data determination model by using a training algorithm including error back-propagation or gradient descent.

Also, the model trainer 1014 may train the data determination model via, for example, supervised learning that uses training data as an input value. Also, the model trainer 1014 may train the data determination model via unsupervised learning, in which standards for determining a state of a user are found by self-learning a type of data required to determine the state of the user without separate supervision. Also, the model trainer 1014 may train the data determination model via, for example, reinforcement learning that uses feedback about whether a result of determining a state of a user via learning is correct.

Also, after the data determination model is trained, the model trainer 1014 may store the trained data determination model. At this time, the model trainer 1014 may store the data determination model in a memory of an apparatus including the data recognizing unit 1020. Alternatively, the model trainer 1014 may store the data determination model in a memory of an apparatus including the data recognizing unit 1020 to be described below. Alternatively, the model trainer 1014 may store the trained data determination model in a memory of a server connected to an electronic apparatus via a wired network or a wireless network.

Here, the memory in which the trained data determination model is stored may also store, for example, a command or data related to another at least one component of an apparatus. Also, the memory may store software and/or a program. The program may include, for example, a kernel, middleware, an application programming interface (API) and/or an application program (or "application").

The model evaluator 1015 may input evaluation data into the data determination model, and when recognition results output from the evaluation data do not satisfy a certain standard, enable the model trainer 1014 to train the data determination model again. Here, the evaluation data may be data pre-set to evaluate the data determination model.

For example, the model evaluator 1015 may determine that the recognition results do not satisfy the certain standard when the number or proportion of pieces of evaluation data of which recognition results are not accurate exceeds a pre-set threshold value, from among recognition results of the trained data determination model with respect to the evaluation data. For example, when the certain standard is 2% and the trained data determination model outputs wrong recognition results with respect to over 20 pieces of evaluation data from among 1000 pieces of evaluation data, the model evaluator 1015 may determine that the trained data determination model is not suitable.

Meanwhile, when there are a plurality of the trained data determination models, the model evaluator 1015 may evaluate whether each of the trained data determination models satisfies the certain standard, and determine the trained data determination model that satisfies the certain standard as a final data determination model. Here, when there are a plurality of data determination models that satisfy the certain standard, the model evaluator 1015 may determine, as the final data determination mode, one or a pre-set number of data determination models in an order of high evaluation scores.

Meanwhile, at least one of the data obtainer 1011, the pre-processor 1012, the training data selector 1013, the model trainer 1014, and the model evaluator 1015 in the data training unit 1010 may be manufactured in at least one hardware chip form and included in an electronic apparatus. For example, at least one of the data obtainer 1011, the pre-processor 1012, the training data selector 1013, the model trainer 1014, and the model evaluator 1015 may be manufactured to be in an AI-exclusive hardware chip or may be manufactured as part of an existing general-purpose processor (for example, a CPU or an application processor) or a graphic-exclusive processor (for example, a GPU), and included in any electronic apparatus described above.

Also, the data obtainer 1011, the pre-processor 1012, the training data selector 1013, the model trainer 1014, and the model evaluator 1015 may be included in one electronic apparatus or in different electronic apparatuses. For example, some of the data obtainer 1011, the pre-processor 1012, the training data selector 1013, the model trainer 1014, and the model evaluator 1015 may be included in an electronic apparatus, and the remainder may be included in a server.

Also, at least one of the data obtainer 1011, the pre-processor 1012, the training data selector 1013, the model trainer 1014, and the model evaluator 1015 may be implemented in a software module. When at least one of the data obtainer 1011, the pre-processor 1012, the training data selector 1013, the model trainer 1014, and the model evaluator 1015 is implemented in a software module (or a program module including an instruction), the software module may be stored in a non-transitory computer-readable recording medium. The software module may be provided by an OS or a certain application. Alternatively, a part of the software module may be provided by an OS and the remainder of the software module may be provided by a certain application.

Figure 16:
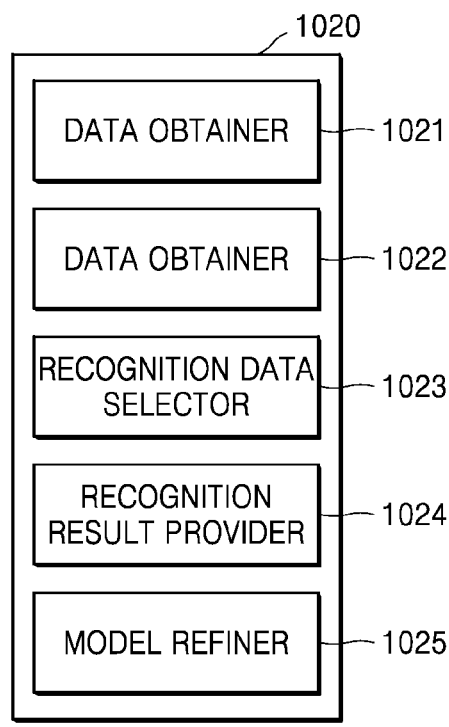
FIG. 16 is a block diagram of a configuration of a data recognizing unit, according to an embodiment.

FIG. 16 is a block diagram of a configuration of the data recognizing unit 1020, according to an embodiment.

Referring to FIG. 16, the data recognizing unit 1020 according to an embodiment may include a data obtainer 1021, a pre-processor 1022, a recognition data selector 1023, a recognition result provider 1024, and a model refiner 1025.

The data obtainer 1021 may obtain data required to recognize an object from an image, and the pre-processor 1022 may pre-process the obtained data such that the obtained data is used to recognize an object from an image. The pre-processor 1022 may process the obtained data to a pre-set format such that the recognition result provider 1024 may use the obtained data to recognize an object from an image.

The recognition data selector 10263 may select data required to recognize an object from an image from the pre-processed data. The selected data may be provided to the recognition result provider 1024. The recognition data selector 1023 may select some or all of the pre-processed data according to pre-set standards for recognizing an object from an image.

The recognition result provider 1024 may recognize an object from an image by applying the selected data to a data determination model. The recognition result provider 1024 may provide a recognition result according to a recognition purpose of data. The recognition result provider 1024 may apply the selected data to the data determination model by using the data selected by the recognition data selector 1023 as an input value. Also, the recognition result may be determined by the data determination model.

The recognition result provider 1024 may provide identification information indicating at least one object recognized from an image. For example, the recognition result provider 1024 may provide information about a category to which an identified object is included and information about a name of an identified person when an identified object is a person.

The model refiner 1025 may refine the data determination model based on an evaluation with respect to the recognition result provided by the recognition result provider 1024. For example, the model refiner 1025 may provide the recognition result provided by the recognition result provider 1024 to the model trainer 1014 such that the model trainer 1014 may refine the data determination model.

Meanwhile, at least one of the data obtainer 1021, the pre-processor 1022, the recognition data selector 1023, the recognition result provider 1024, and the model refiner 1025 in the data recognizing unit 1020 may be manufactured in at least one hardware chip form and included in an electronic apparatus. For example, at least one of the data obtainer 1021, the pre-processor 1022, the recognition data selector 1023, the recognition result provider 1024, and the model refiner 1025 may be manufactured to be in an AI-exclusive hardware chip or may be manufactured as part of an existing general-purpose processor (for example, CPU or an application processor) or a graphic-exclusive processor (for example, GPU), and included in any electronic apparatus described above.

Also, at least one of the data obtainer 1021, the pre-processor 1022, the recognition data selector 1023, the recognition result provider 1024, and the model refiner 1025 may be included in one electronic apparatus or in different electronic apparatuses. For example, some of the data obtainer 1021, the pre-processor 1022, the recognition data selector 1023, the recognition result provider 1024, and the model refiner 1025 may be included in an electronic apparatus, and the remainder may be included in a server.

Also, at least one of the data obtainer 1021, the pre-processor 1022, the recognition data selector 1023, the recognition result provider 1024, and the model refiner 1025 may be implemented in a software module. When at least one of the data obtainer 1021, the pre-processor 1022, the recognition data selector 1023, the recognition result provider 1024, and the model refiner 1025 is implemented in a software module (or a program module including an instruction), the software module may be stored in a non-transitory computer-readable recording medium. The software module may be provided by an OS or a certain application. Alternatively, a part of the software module may be provided by an OS and the remainder of the software module may be provided by a certain application.

Figure 17:
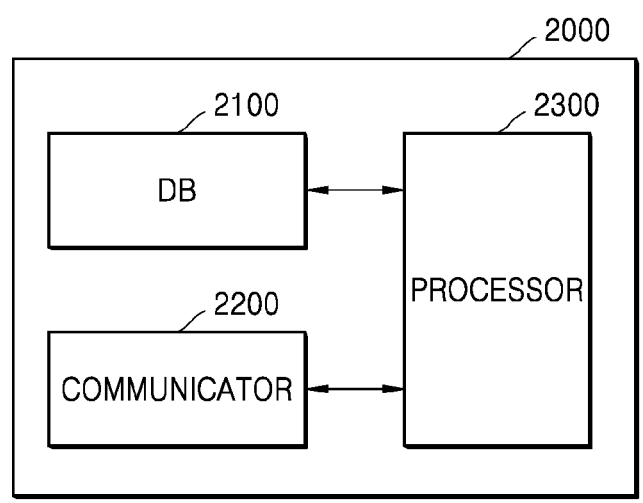
FIG. 17 is a block diagram of a configuration of a server, according to an embodiment.

FIG. 17 is a block diagram of a configuration of the server 2000, according to an embodiment.

Referring to FIG. 17, the server 2000 according to an embodiment may include a database (DB) 2100, a communicator 2200, and a processor 2300. The server 2000 shown in FIG. 17 may operate in association with, for example, the image display apparatus 201 according to an embodiment, and may perform at least one of object recognition, true image generation, and false image generation.

The DB 2100 may store an image indicating at least one object recognized from content viewed by a user.

The communicator 2200 may include at least one component for communicating with the image display apparatus 201.

The processor 2300 generally controls overall operations of the server 2000. For example, the processor 2300 may generally control the DB 2100 and the communicator 2200 by executing programs stored in the server DB 2100 of the server 2000. The processor 2300 may perform a function for recognizing at least one object from an image to generate at least one true image or at least one false image, which is a function performed by the image display apparatus 201, which have been described with reference to FIGS. 1 through 16, by executing programs stored in the DB 2100.

Figure 18:
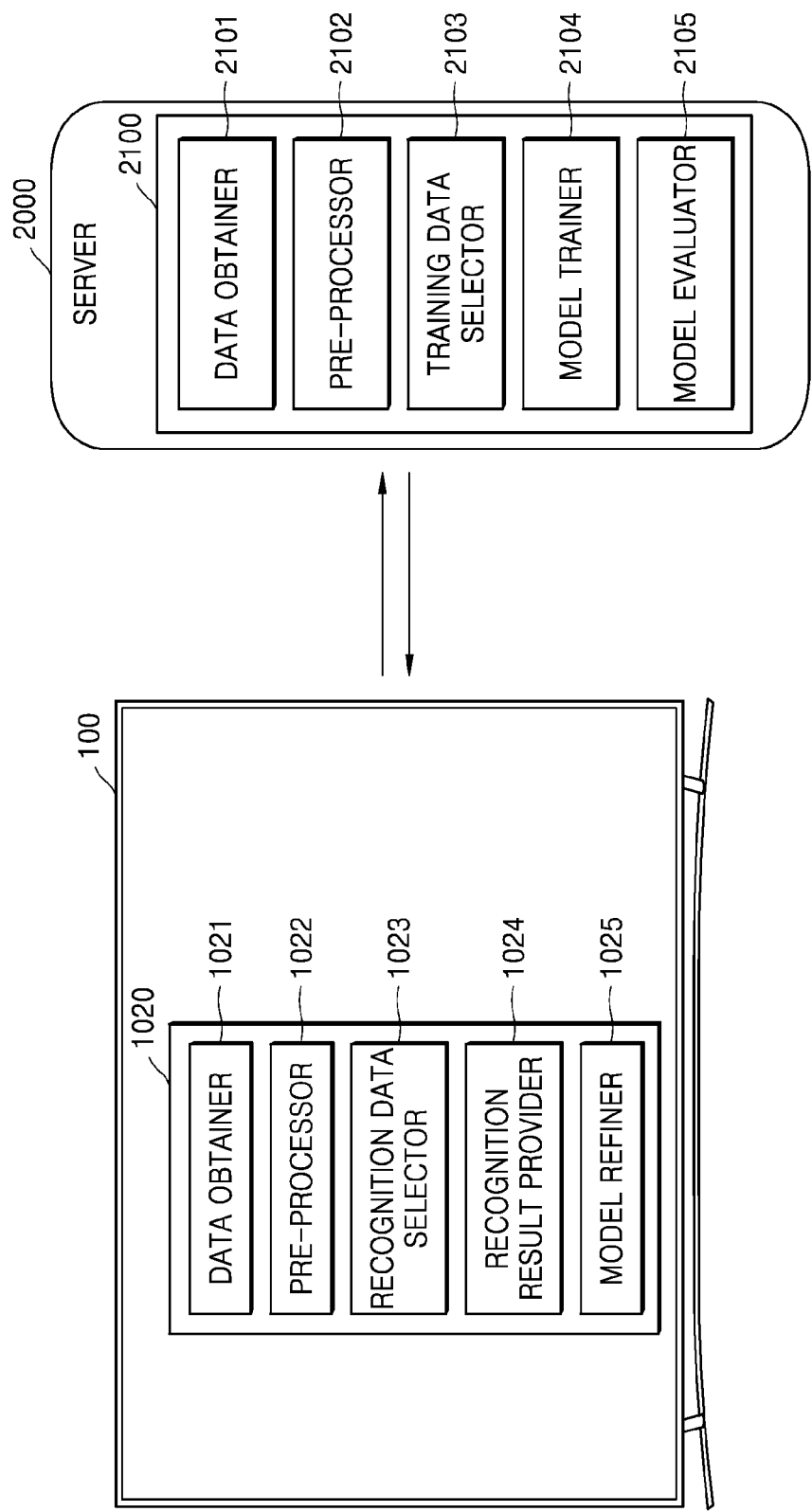
FIG. 18 is a diagram of an example in which an image display apparatus and a server interwork with each other to learn and recognize data, according to an embodiment.

FIG. 18 is a diagram of an example in which the image display apparatus 100 and the server 2000 interwork with each other to learn and recognize data, according to an embodiment.

Referring to FIG. 18, the server 2000 may learn a standard for recognizing at least one object from an image. The server 2000 may obtain data to be used for learning, and apply the obtained data to a data determination model to learn the standard for recognizing at least one object from an image. And, the server DB 2100 may performs functions correspond to the data training unit 1010 of FIG. 15.

In this case, a model trainer 2104 of the server 2000 may perform functions of the data training unit 1010 of FIG. 15. The model trainer 2104 of the server 2000 may learn a standard about which data is to be used to recognize an object from an image. Also, the model trainer 2104 of the server 2000 may learn a standard about how to recognize an object from an image by using data. The model trainer 2104 may obtain data to be used for learning and apply the obtained data to a data determination model to learn a standard for recognizing an object from an image.

Also, the image display apparatus 100 may control the server 2000 to recognize an object from an image by applying data selected by the recognition data selector 1023 by using a data determination model generated by the server 2000. For example, the recognition result provider 1024 may transmit the data selected by the recognition data selector 1023 to the server 2000. Further, the recognition result provider 1024 may request to recognize an object from an image corresponding to the transmitted data. And, the server 2000 may recognize an object from the image corresponding to the transmitted data. And, the server 2000 may transmit recognition results.

Alternatively, the recognition result provider 1024 of the image display apparatus 100 may receive a data determination model generated by the server 2000 and recognize an object from an image by using the received data determination model. In this case, the recognition result provider 1024 of the image display apparatus 100 may recognize an object from an image by applying data selected by the recognition data selector 1023 to a data determination model received from the server 2000.

Also, the image display apparatus 100 and the server 2000 may effectively distribute and perform operations for learning a data determination model and recognizing data, and accordingly, a data process may be efficiently performed to provide a service matching a user's intention and effectively protect user's privacy.

With the current increase in the number of electronic devices connected to an AI-based Internet of things (IoT), electronic devices including a camera and providing a computer vision (CV)-based service performed by using the included camera are being developed and supplied.

An electronic device capable of providing a CV-based service (hereinafter, referred to as a 'CV-based electronic device') may be misused in hacking or the like. For example, the CV-based electronic device may capture an authentication image set described above, and select images corresponding to true images by performing object recognition on the captured authentication image set via an AI-based determination model. Here, the CV-based electronic device may be misused and self-perform user authentication through the authentication image set. In this case, the image display apparatus 201 may determine that the user authentication is succeeded despite the CV-based electronic device is not a user does not have proper authority, and perform operations requested by the CV-based electronic device.

Thus, a method of maintaining security of the image display apparatus 201 by overcoming issues (for example, AI-based hacking) that may occur when the CV-based electronic device is misused in hacking needs to be developed.

Hereinafter, additional operations performed to increase security according to one or more embodiments described with reference to FIGS. 1 through 18 will be described with reference to FIGS. 19 through 23.

Figure 19:
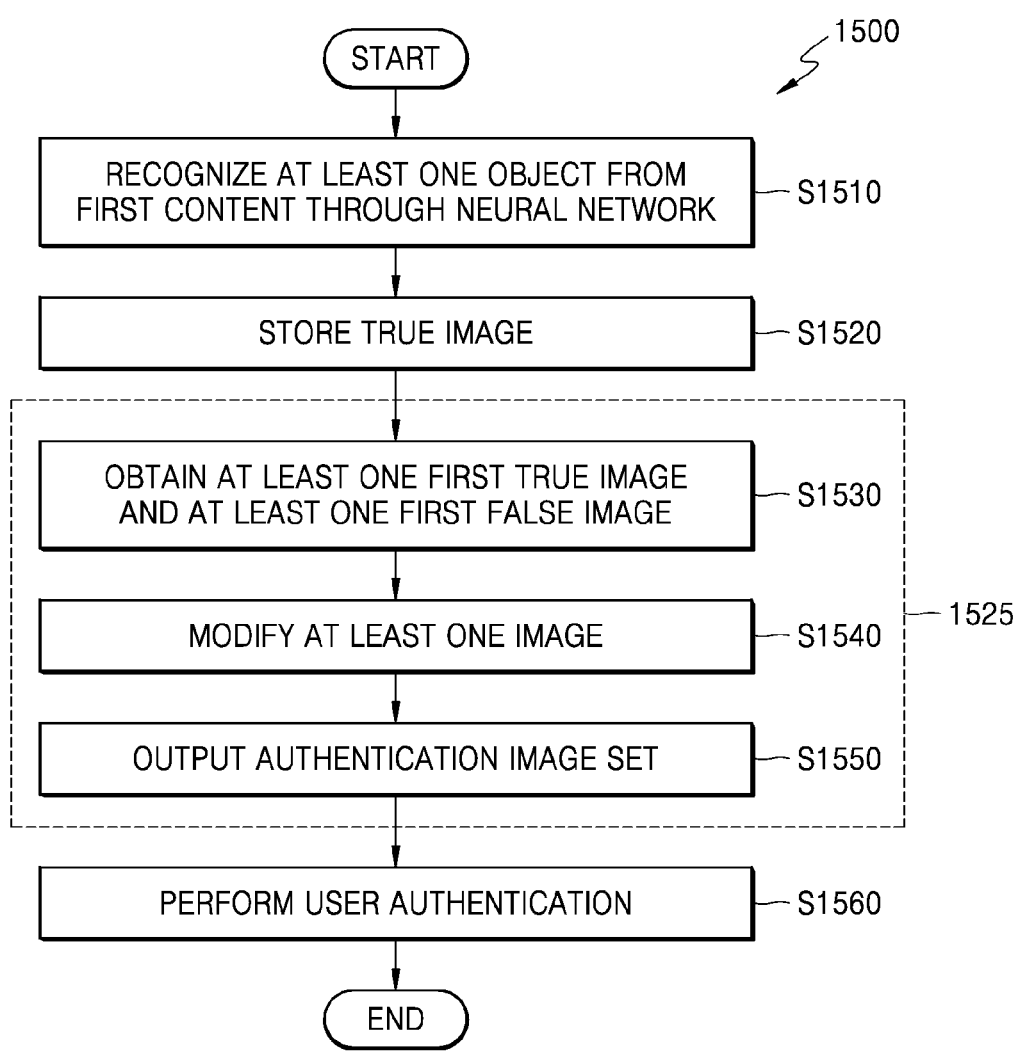
FIG. 19 is a flowchart of an operating method of an image display apparatus, according to another embodiment.

FIG. 19 is a flowchart of an operating method 1500 of an image display apparatus, according to another embodiment. In particular, FIG. 19 is a flowchart of operations performed by, for example, the image display apparatus 100, 100a, 201, 202, or 300 according to one or more embodiments. Also, FIG. 19 is a flowchart of the operating method 1500 of an image display apparatus, which may be performed by, for example, the image display apparatus 100, 100a, 201, 202, or 300 according to one or more embodiments.

Also, operations S1510, S1520, and S1560 of the operating method 1500 of FIG. 15 may respectively correspond to operations S900, S910, and S930 of the operating method 900 of FIG. 9. Also, operation S1525 of the operating method 1500 may correspond to operation S920 of the operating method 900.

Accordingly, details that overlap those of FIGS. 1 through 18 while describing the operating method 1500 will not be provided again.

Also, hereinafter, the operating method 1500 will be described with reference to the image display apparatus 201.

Referring to FIG. 19, in operation S1510, the image display apparatus 201 recognizes at least one object from first content output on the display 230 of the image display apparatus 201 and viewed by a user, through at least one neural network.

In operation S1520, the image display apparatus 201 stores an image indicating the at least one object recognized from the first content in a database as a true image.

In operation S1525, the image display apparatus 201 may perform an operation of generating and outputting an authentication image set in response to a user authentication request. In particular, operation S1525 may be performed according to control of the processor 220.

In particular, the image display apparatus 201 may select and obtain at least one true image and at least one false image respectively from a plurality of true images and a plurality of false images stored in a database, in operation S1530. Hereinafter, for convenience of description, the selected at least one true image and at least one false image will be respectively referred to as at least one first true image and at least one first false image. In other words, at least one first true image may be obtained by selecting at least one of the plurality of true images stored in the database. Also, at least one first false image may be obtained by selecting at least one of the plurality of false images stored in the database.

Then, at least one of the at least one first true image and at least one first false image obtained in operation S1530 is modified in operation S1540, and an authentication image set is output based on the modification in operation S1550.

In particular, in operation S1540, at least one modified image is generated by modifying at least one of the at least one first true image and at least one first false image obtained in operation S1530. In particular, the at least one modified image may be generated by modifying at least one of the at least one first true image and at least one first false image obtained in operation S1530, via adversarial example (AE) technique.

Here, the AE technique is a method in which a small change is applied to natural data such that a person normally recognizes the natural data but a machine learning model including AI erroneously recognizes the natural data. In particular, an example of the AE technique includes CNN variation. In particular, in the AE technique, a modified image may be generated by adding a noise signal to at least a partial region of at least one image obtained in operation S1530.

Then, in operation S1550, the authentication image set including 'the at least one modified image obtained in operation S1540' and 'the remaining of the at least one first true image and the at least one first false image obtained in operation S1530, which are not modified in operation S1540' is generated and output.

In operation S1560, the image display apparatus 201 may perform user authentication in response to a user input of selecting at least one image from the authentication image set output in operation S1550.

In particular, one modified image may be generated by modifying one first true image via AE technique. In this case, when a machine learning model including AI (alternatively, an AI-based determination model), for example, a model using a neural network recognizes an object included in the modified image, the model using a neural network recognizes the modified image as a false image as a result of object recognition. However, a user of an image display apparatus recognizes the modified image as a true image.

In other words, when a first true image is modified via AE technique according to an embodiment, a person recognizes the modified first true image as a true image, but a machine learning model including AI recognizes the modified first true image as a false image.

Also, when a first false image is modified via AE technique according to an embodiment, a person recognizes the modified first false image still as a false image, but a machine learning model including AI may recognize the modified first false image as a true image instead of a false image.

In other words, in operation S1540, an image, in particular, an object included in the image may be modified via AE technique such that a person recognizes the object as the same object before and after modification, but an AI-based determination model recognizes the object as different objects before and after modification.

When three true images and five false images are selected in operation S1530 as in the authentication image set of FIG. 11, i.e., when the authentication image set includes three first true images 801 through 803 and five first false images (remaining images excepting the three first true images 801 through 803 in the authentication image set of FIG. 11), the three true images 801 through 803 need to be selected in FIG. 11 for the user authentication to succeed.

In operation S1530, the true image 801 among the three true images 801 through 803 and the five false images may be modified via AE technique. Then, a user who is a person still recognizes the modified true image 801 as a true image. Thus, the user is able to select the true images 801 through 803 as true images from the authenticated image set. However, when object recognition is performed through a machine learning model including AI, the modified true image 801 is recognized as a false image. In other words, when a CV-based electronic device captures an authentication image set and recognizes an object from the captured authentication image set, the CV-based electronic device recognizes the modified true image 801 as a false image instead of a true image. Accordingly, the CV-based electronic device only selects the true images 802 and 803 from the authentication image set, and thus is unable to complete the user authentication.

As another example, in operation S1530, the false image 805 among the true images 801 through 803 and the five false images may be modified via AE technique. Then, a user who is a person still recognizes the modified false image 805 as a false image. Thus, the user is able to select the three true images 801 through 803 as true images from the authentication image set. However, when object recognition is performed through a machine learning model including AI, the modified false image 805 is recognized as a true image. In other words, when a CV-based electronic device captures an authentication image set and recognizes an object from the captured authentication image set the CV-based electronic device recognizes the modified false image 805 as a true image. Accordingly, the CV-based electronic device may selects the true images 801 and 803 and the false image 805 as true images from the authentication image set, and thus is unable to complete the user authentication.

Figure 20:
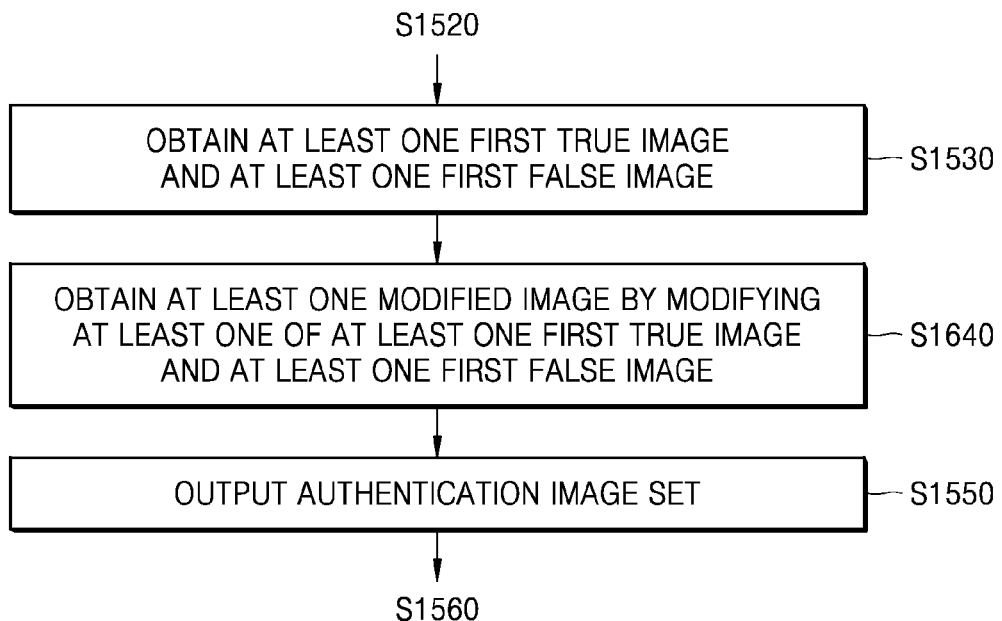
FIG. 20 is a flowchart for describing the operating method of an image display apparatus of FIG. 19 in further detail, according to an embodiment.

FIG. 20 is a flowchart for describing the operating method 1500 of an image display apparatus of FIG. 19 in further detail, according to an embodiment. Like elements of FIGS. 16 and 19 are denoted by like reference numerals. In particular, operation S1640 of FIG. 19 may correspond to operation S1540 of FIG. 20. Also, operation S1640 may be performed according to control of the processor 220.

Referring to FIG. 20, at least one modified image is generated in operation S1640 by modifying at least one of the at least one first true image and at least one first false image obtained in operation S1530.

For example, at least one second true image may be generated by modifying at least one true image selected from the at least one first true image obtained in operation S1530 via AE technique. In this case, when object recognition is performed on the second true image through a neural network (in other words, when AI-based object recognition is performed), a result of the object recognition differs from determination of a person. Also, an authentication image set including the at least one second true image, the remaining excluding the at least one true image (in particular, at least one image corresponding to the at least one second true image) selected from the at least one first true image, and the at least one first false image may be output.

As another example, at least one second false image may be generated by modifying at least one false image selected from the at least one first false image obtained in operation S1530 via AE technique. In this case, when object recognition is performed on the second false image through a neural network (in other words, when AI-based object recognition is performed), a result of the object recognition differs from determination of a person. Also, an authentication image set including the at least one false true image, the remaining excluding the at least one false image (in particular, at least one image corresponding to the at least one second false image) selected from the at least one first false image, and the at least one first true image may be output.

Figure 22:
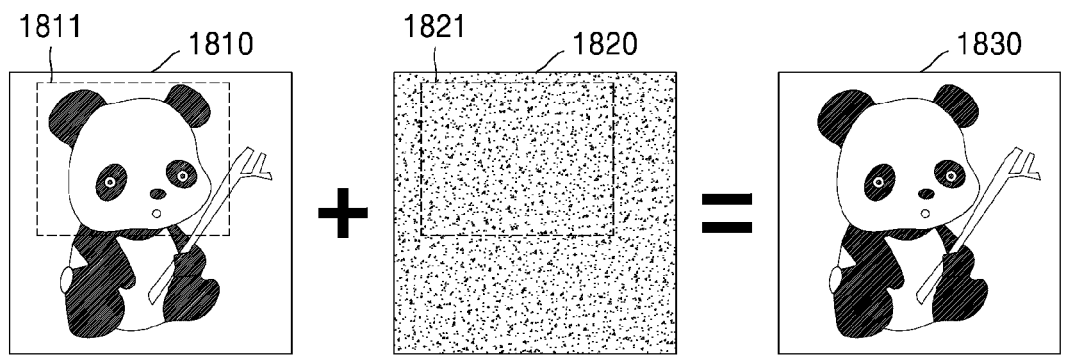
FIG. 22 is a diagram for describing an operation of an image display apparatus generating a modified image, according to an embodiment.

FIG. 22 is a diagram for describing an operation of an image display apparatus generating a modified image, according to an embodiment.

FIG. 22 illustrates an image 1810 before being modified and an image 1830 modified via AE technique. Here, an object included in the image 1810 may be a panda.

In particular, the image 1830 may be generated by adding a noise signal 1820 to at least a partial region of the image 1810. In particular, the image 1830 may be generated by adding the noise signal 1820 to at least a partial region in which the panda included in the image 1810 is imaged.

The noise signal 1820 may have a certain shape, amount, and/or application region such that an AI-based determination model may erroneously recognize an object included in the image 1810. Also, the noise signal 1820 may be any noise signal having a noise component such that an AI-based determination model differently recognizes an object included in the image 1810. For example, with respect to object recognition of an AI-based determination model, the noise signal 1820 may be set such that an image component in at least a partial region in the image 1810, which enables the object included in the image 1810 to be recognized as a panda, is weakened and an image component in at least a partial region in the image 1810, which enables the object to be recognized as a gibbon, is reinforced. Also, since the noise signal 1820 may have all noise components that modify the image 1810 such that an AI-based determination model differently recognizes the object included in the image 1810, the noise signal 1820 may be set to have very various shapes, amounts, and/or application regions.

Also, in FIG. 18, the noise signal 1820 having the same application region as the image 1810 is added to the image 1810, but alternatively, a noise signal having an application region 1821 corresponding to a partial region 1811 of the object included in the image 1810 may be added to the image 1810.

As described above, according to an embodiment, the image 1830 is generated by adding, for example, the noise signal 1820, to the image 1810 such that a result of object recognition varies when an AI-based determination model performs the object recognition.

When the image 1810 is modified via AE technique of adding the noise signal 1820, a person recognizes the image 1830 to be identical to the image 1810. In other words, the person recognizes objects included in the images 1810 and 1830 to be both a panda. However, when object recognition is performed by an AI-based determination model, the object included in the image 1810 is recognized to be a panda, but the object included in the image 1830 is recognized to be a gibbon.

Hereinafter, an operation of performing object recognition through an AI-based determination model will be described in detail with reference to FIG. 23.

Figure 23:
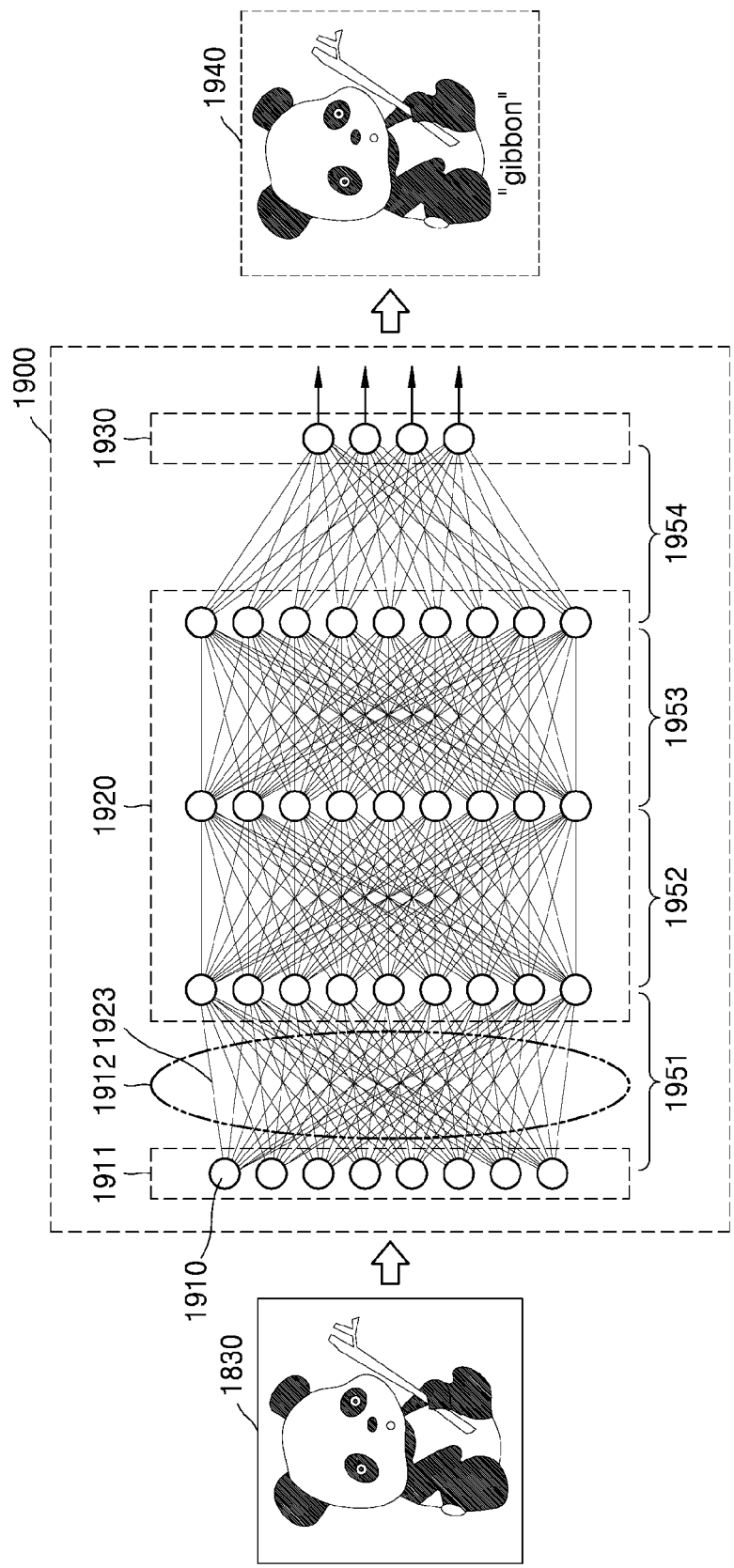
FIG. 23 is a diagram for describing an authenticating operation using a modified image generated by an image display apparatus, according to an embodiment.

FIG. 23 is a diagram for describing an authenticating operation using a modified image generated by an image display apparatus, according to an embodiment. In particular, FIG. 23 illustrates an example in which object recognition is performed through a neural network that is an AI-based determination model. In particular, in FIG. 23, an AI-based determination model performs object recognition through a neural network. In particular, in FIG. 23, a DNN 1900 in which a hidden layer has three depths is illustrated. Also, the image 1830 of FIG. 22 may be input to the DNN 1900.

The image display apparatus 201 or the server 500 may perform object recognition by performing operations through the DNN 1900.

Referring to FIG. 23, the DNN 1900 may be trained through training data. Also, the trained DNN 1900 may perform inference for object recognition. Here, the DNN 1900 maybe variously designed according to an implementation type (for example, CNN) of a model, accuracy of a result, reliability of a result, a processing speed of a processor, and capacity of the processor.

The DNN 1900 may include an input layer 1911, a hidden layer 1920, and an output layer 1930 to perform operations for object recognition. Also, the DNN 1900 may include a first layer 1951 formed between the input layer 1911 and a first hidden layer, a second layer 1952 formed between the first hidden layer and a second hidden layer, a third layer 1953 formed between the second hidden layer and a third hidden layer, and a fourth layer 1954 formed between the third hidden layer and the output layer 1930.

Each of a plurality of layers forming the DNN 1900 may include at least one node. For example, the input layer 1911 may include at least one node receiving data. In FIG. 23, the input layer 1911 includes a plurality of nodes 1910. A plurality of images obtained by scaling the image 1830 may be input to the plurality of nodes 1910. In particular, a plurality of images obtained by scaling the image 1830 according to frequency bands may be input to the plurality of nodes 1910.

Here, two adjacent layers may be connected by a plurality of edges as indicated by a reference numeral 1912. Since each node have a respective weight value, the DNN 1900 may obtain output data based on a value obtained via calculation, for example, multiplication of an input signal and a weight value.

The DNN 1900 is trained based on a plurality of training images, and may be built as an object recognition model for recognizing an object included in an image. In particular, in order to increase accuracy of a result output through the DNN 1900, weight values may be amended while repeatedly performing training in a direction from the output layer 1930 to the input layer 1911 based on a plurality of training images.

Then, the DNN 1900 having finally amended weight values may be used as an object recognition model. In particular, the DNN 1900 may output a result of which object is included in a training image by analyzing information included in a plurality of training images that are input data.

When the DNN 1900 is trained to receive an image and recognize an object included in the image, upon receiving the image 1810 before being modified, the DNN 1900 may analyze the image 1810 and output a result that the object included in the image 1810 is a panda.

Also, upon receiving the image 1830 after being modified, the DNN 1900 may analyze the image 1830 and output a result that the object included in the image 1830 is a gibbon. In other words, a user may recognize the object included in the image 1830 as a panda, but the DNN 1900 that is an AI-based object recognition model recognizes the object included in the image 1830 as a gibbon.

According to an embodiment, AI-based hacking is prevented and security may be increased by modifying at least one image included in an authentication image set according to AE technique.

Figure 21:
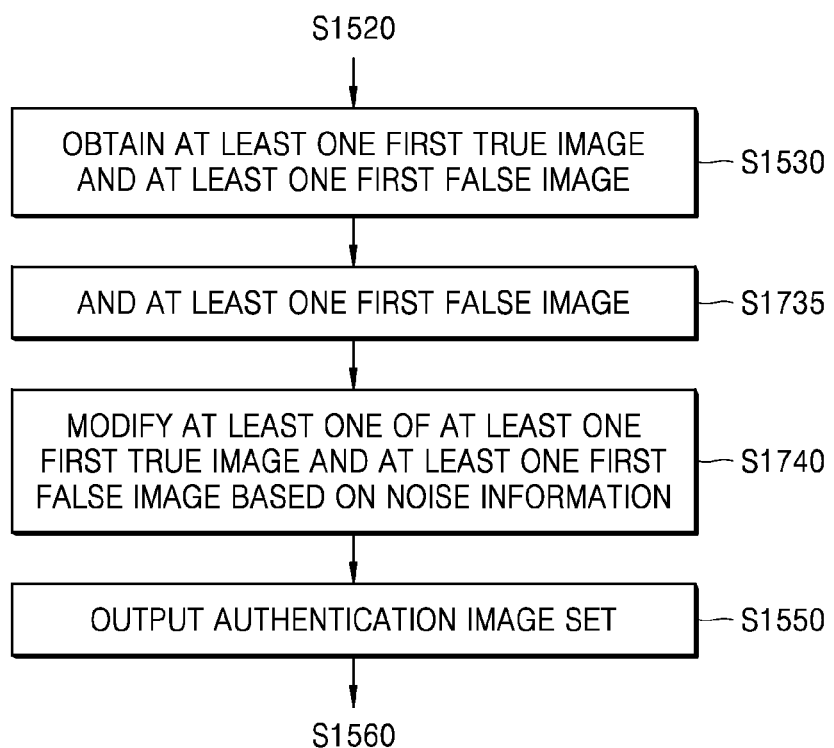
FIG. 21 is a flowchart for describing the operating method of an image display apparatus of FIG. 19 in further detail, according to another embodiment.

FIG. 21 is a flowchart for describing the operating method 1500 of an image display apparatus of FIG. 19 in further detail, according to another embodiment. In particular, operation S1540 of FIG. 15 may include operations S1735 and S1740.

According to an embodiment, the processor 220 may generate noise information in response to a user authentication request, in operation S1735. Also, at least one modified image may be generated by modifying at least one of the at least one first true image and at least one first false image obtained in operation S1530, based on the generated noise information, in operation S1740.

Here, the noise information generated in operation S1735 may be information about the noise signal 1820 added to an image to be modified, for example, the image 1810 of FIG. 22. In particular, the noise information may include information about at least one of a method of generating a noise signal to be applied to at least one image to be modified, a form of a noise signal, and an amount of a noise signal.

According to one or more embodiments, noise information may be changed whenever a user authentication request is generated. The noise information may be refined whenever the user authentication request is generated, and when an image is modified by using the refined noise information, an authentication image set including the modified image may have higher security.

As described above, according to one or more embodiments, an object included in content viewed by a user is recognized and user authentication is performed by using an authentication image set including at least one image including the recognized object, and thus it may be determined whether a user of an image display apparatus, for example, the image display apparatus 201, has proper authority while maintaining high security. Also, according to one or more embodiments, at least one image to be included in an authentication image set is modified by using AE technique so as to prevent an AI-based hacking attack, thereby increasing security.

Some embodiments may also be realized in a form of a non-transitory computer-readable recording medium, such as a program module executed by a computer, which includes computer-readable instructions. A non-transitory computer-readable recording medium may be an arbitrary available medium accessible by a computer, and examples thereof include all volatile and non-volatile media and separable and non-separable media. Further, examples of the non-transitory computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium typically include a computer-readable instruction, a data structure, a program module, other data of a modulated data signal, or another transmission mechanism, and an example thereof includes an arbitrary information transmission medium.

Also, in the present specification, a "unit" may be a hardware component, such as a processor or a circuit, and/or a software component executed by a hardware component, such as a processor.

Further, an image display apparatus and an operating method of the same according to one or more embodiments of the present disclosure may be implemented in a computer program product including a non-transitory computer-readable medium having recorded thereon a program for performing: an operation of obtaining a sentence in a multi lingual; and an operation of obtaining vector values corresponding to each words included in the sentence by using a multi lingual translation model, convert the obtained vector values to vector values corresponding to a target language, and obtaining a sentence in the target language based on the converted vector values.

While the present disclosure has been particularly shown and described with reference to exemplary embodiments thereof, it will be understood by one of ordinary skill in the art that various changes in form and details may be made therein without departing from the technical ideas and essential features of the present disclosure. Hence, it will be understood that the embodiments described above are not limiting the scope of the disclosure. For example, each component described in a single type may be executed in a distributed manner, and components described distributed may also be executed in an integrated form.

The scope of the present disclosure is indicated by the claims which will be described in the following rather than the detailed description of the disclosure, and it should be understood that the claims and all modifications or modified forms drawn from the concept of the claims are included in the scope of the present disclosure.

The invention claimed is:

1. An image display apparatus comprising:
a display;
a memory storing at least one instruction;
a processor configured to execute the at least one instruction stored in the memory to:
recognize at least one object from first content output on the display and viewed by a user, by using a learning model using at least one neural network;
store an image indicating the at least one object recognized from the first content in a database as a true image;
in response to a user authentication request, select at least one first true image and at least one first false image respectively from a plurality of true images and a plurality of false images stored in the database, and control the display to output an authentication image set comprising the selected at least one first true image and at least one first false image; and
perform user authentication in response to a user input of selecting at least one image from the authentication image set.

2. The image display apparatus of claim 1,
wherein the first content is content viewed within a pre-set time from a point of time when the user authentication request is received, and
the image indicating the at least one object recognized from the first content includes at least one object extracted from the first content.

3. The image display apparatus of claim 1,
wherein the processor is further configured to execute the at least one instruction to:
recognize at least one object from second content viewed a pre-set time before a point of time when the user authentication request is received, by using the learning model using the at least one neural network; and
obtain an image indicating at least one object recognized from the second content as one of the plurality of false image.

4. The image display apparatus of claim 1,
wherein the processor is further configured to execute the at least one instruction to:
recognize at least one face from the first content by using the learning model using the at least one neural network; and
store, as the true image, an image indicating a person corresponding to each of the at least one face recognized from the first content in the database.

5. The image display apparatus of claim 1,
wherein the at least one object comprises
at least one of a person, a background, and a thing appearing in at least one frame among a plurality of frames forming the first content.

6. The image display apparatus of claim 1,
wherein the processor is further configured to execute the at least one instruction to:
recognize the at least one object from a plurality of frames forming the first content by using the learning model using the at least one neural network; and
store, as the true image, an image indicating an object included in the plurality of frames at least a pre-set number of times among the recognized at least one object in the database.

7. The image display apparatus of claim 1, wherein the processor is further configured to execute the at least one instruction to:
generate at least one modified image by modifying at least one of the at least one first true image and at least one first false image via an adversarial example technique; and
control the display to output the authentication image set comprising the at least one modified image and the remaining of the at least one first true image and the at least one first false image, which are not modified.

8. The image display apparatus of claim 7, wherein the processor is further configured to execute the at least one instruction to:
generate noise information in response to the user authentication request; and generate the at least one modified image by modifying at least one of the at least one first true image and the at least one first false image, based on the generated noise information.

9. The image display apparatus of claim 8,
wherein the noise information comprises information about at least one of a method of generating a noise signal to be applied to at least one image to be modified, a form of the noise signal, and an amount of the noise signal.

10. The image display apparatus of claim 1, wherein the processor is further configured to execute the at least one instruction to:

generate at least one second true image by modifying at least one true image selected from the at least one first true image via an adversarial example technique; and
control the display to output the authentication image set comprising the at least one second true image, remaining of the at least one first true image excluding the selected at least one true image, and the at least one first false image.

11. The image display apparatus of claim 1, wherein the processor is further configured to execute the at least one instruction to:

generate at least one modified image by adding a noise signal to at least one of the at least one first true image and at least one first false image; and
control the display to output the authentication image set comprising the at least one modified image and remaining of the at least one first true image and at least one first false image, to which the noise signal is not added.

12. The image display apparatus of claim 1,
wherein the processor is further configured to execute the at least one instruction to
receive, from an external server, at least one of the plurality of false images stored in the database and the learning model.

13. The image display apparatus of claim 1,
wherein the processor is further configured to execute the at least one instruction to
determine a user who requested the user authentication as an authorized user in response to a user input of selecting all of the at least one first true image from the authentication image set.

14. The image display apparatus of claim 13,
wherein the processor is further configured to execute the at least one instruction to
control the display to output a new authentication image set in response to a user input that failed to select all of the at least one first true image from the authentication image set.

15. An operating method of an image display apparatus, the operating method comprising:

recognizing at least one object from first content output on a display of the image display apparatus and viewed by a user, by using a learning model using at least one neural network;
storing an image indicating the at least one object recognized from the first content in a database as a true image;
in response to a user authentication request, selecting at least one first true image and at least one first false image respectively from a plurality of true images and a plurality of false images stored in the database, and outputting an authentication image set comprising the selected at least one first true image and at least one first false image; and
performing user authentication in response to a user input of selecting at least one image from the authentication image set.

* * * * *